US012713408B2

(12) United States Patent
Xu et al.

(10) Patent No.: US 12,713,408 B2
(45) Date of Patent: Aug. 18, 2026

(54) MULTI-SHARED CHANNEL SCHEDULING FOR EXTENDED REALITY

(71) Applicant: QUALCOMM Incorporated, San Diego, CA (US)

(72) Inventors: Huilin Xu, Temecula, CA (US); Jing Sun, San Diego, CA (US); Mostafa Khoshnevisan, San Diego, CA (US); Ahmed Abdelaziz Ibrahim Abdelaziz Zewail, San Diego, CA (US); Wei Yang, San Diego, CA (US); Yuchul Kim, San Diego, CA (US); Yeliz Tokgoz, San Diego, CA (US); Jay Kumar Sundararajan, San Diego, CA (US); Nicolas Cornillet, Lannion (FR); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 18/179,709

(22) Filed: Mar. 7, 2023

(65) Prior Publication Data

US 2023/0337197 A1 Oct. 19, 2023

Related U.S. Application Data

(60) Provisional application No. 63/332,545, filed on Apr. 19, 2022.

(51) Int. Cl.

| | |
|---|---|
| ***H04W 72/0446*** | (2023.01) |
| ***H04W 72/23*** | (2023.01) |
| ***H04W 74/04*** | (2009.01) |

(52) U.S. Cl.

CPC ....... *H04W 72/0446* (2013.01); *H04W 72/23* (2023.01); *H04W 74/04* (2013.01)

(58) Field of Classification Search

CPC ... H04L 1/1819; H04L 1/1887; H04L 1/1893; H04L 5/001; H04L 5/0044; H04L 5/0053;

(Continued)

(56) References Cited

U.S. PATENT DOCUMENTS

| | | | | |
|---|---|---|---|---|
| 8,675,513 B1 * | 3/2014 | Vargantwar | H04L 1/0033 370/252 |
| 11,025,456 B2 * | 6/2021 | Chatterjee | H04L 25/0226 |

(Continued)

FOREIGN PATENT DOCUMENTS

WO WO-2021091350 A1 5/2021

OTHER PUBLICATIONS

U.S. Appl. No. 63/313,200 (Year: 2022).*

(Continued)

*Primary Examiner* — Dung B Huynh

(74) *Attorney, Agent, or Firm* — QUALCOMM Incorporated

(57) ABSTRACT

Methods, systems, and devices for wireless communications are described. A user equipment (UE) may receive a first message indicating a first set of parameters associated with time domain resource allocation (TDRA) information for a first quantity of shared channels. The UE may receive a second message (e.g., downlink control information (DCI)) scheduling a set of shared channels, a second quantity of the set of shared channels exceeding the first quantity. The set of shared channels may include a first subset of shared channels corresponding to the first quantity, and a second subset of shared channels including additional shared channels. In addition, the UE may determine a second set of parameters for the second subset based on the first set of parameters, where the UE and a network entity may communicate the first subset using the first set of parameters and the second subset using the second set of parameters.

30 Claims, 19 Drawing Sheets

(58) Field of Classification Search
CPC ............ H04L 5/0094; H04W 72/0446; H04W 72/23; H04W 74/04
See application file for complete search history.

(56) References Cited

U.S. PATENT DOCUMENTS 12,003,335 B2* 6/2024 Yang ..................... H04L 1/1812
12,457,588 B2* 10/2025 Yi ..................... H04W 72/0446
2012/0135769 A1* 5/2012 Li ..................... H04W 72/29 455/509
2015/0215097 A1* 7/2015 Yi ..................... H04L 5/001 370/329
2019/0052406 A1* 2/2019 Yang ..................... H04L 1/1819
2020/0014491 A1* 1/2020 Takeda ..................... H04L 5/0055
2020/0053718 A1* 2/2020 Huang ..................... H04W 72/51
2020/0084802 A1* 3/2020 Jung ..................... H04W 74/0833
2021/0160037 A1* 5/2021 Ji ..................... H04L 5/0044
2021/0258999 A1* 8/2021 Xu ..................... H04L 5/001
2021/0352735 A1* 11/2021 Bae ..................... H04W 52/48
2021/0378001 A1* 12/2021 Luo ..................... H04W 72/1263
2022/0030620 A1* 1/2022 Cirik ..................... H04W 16/28
2022/0104187 A1* 3/2022 Zhou ..................... H04W 72/0446
2022/0159706 A1* 5/2022 Panteleev ..................... H04W 72/23
2022/0183004 A1* 6/2022 Huang ..................... H04L 1/1812
2022/0190981 A1* 6/2022 Xu ..................... H04L 5/0094
2022/0201726 A1* 6/2022 Papasakellariou ..................... H04W 72/1273
2022/0225360 A1* 7/2022 Yi ..................... H04W 72/21
2022/0263603 A1* 8/2022 Papasakellariou .... H04L 5/0055
2022/0264608 A1* 8/2022 Bae ..................... H04W 72/1268
2022/0272724 A1* 8/2022 Oteri ..................... H04L 5/0094
2022/0287103 A1* 9/2022 Cozzo ..................... H04W 74/0833
2022/0295484 A1* 9/2022 Yi ..................... H04W 72/0446
2022/0311549 A1* 9/2022 He ..................... H04W 72/23
2022/0312337 A1* 9/2022 Lim ..................... H04W 52/242
2022/0322314 A1* 10/2022 Rastegardoost ...... H04W 72/23
2022/0346104 A1* 10/2022 Yi ..................... H04L 1/1614
2022/0346129 A1* 10/2022 Kumagai .......... H04W 72/0446
2022/0361147 A1* 11/2022 Sarkis ..................... H04W 72/0446
2022/0361220 A1* 11/2022 Zewail ..................... H04W 72/1268
2022/0369296 A1* 11/2022 Hu ..................... H04L 1/1861
2022/0394708 A1* 12/2022 Gao ..................... H04W 72/0446
2023/0023656 A1* 1/2023 Rastegardoost .. H04W 72/0446
2023/0028029 A1* 1/2023 Cui ..................... H04L 1/1819
2023/0039613 A1* 2/2023 Sakhnini ..................... H04W 72/23
2023/0043279 A1* 2/2023 Ma ..................... H04W 72/1273
2023/0057605 A1* 2/2023 MolavianJazi ....... H04L 5/0053
2023/0076119 A1* 3/2023 Zewail ..................... H04L 1/1819
2023/0087925 A1* 3/2023 Zewail ..................... H04L 5/0053 370/329
2023/0129120 A1* 4/2023 MolavianJazi ....... H04L 1/1887 370/329
2023/0137523 A1* 5/2023 Babaei ..................... H04L 1/1887 370/329
2023/0139269 A1* 5/2023 MolavianJazi ....... H04L 5/0044 370/329
2023/0156659 A1* 5/2023 Li ..................... H04W 68/02 455/458
2023/0156736 A1* 5/2023 He ..................... H04L 5/0044 370/329
2023/0180228 A1* 6/2023 Tian ..................... H04W 72/23 370/329
2023/0189288 A1* 6/2023 Karaki ..................... H04W 72/12 370/329
2023/0209530 A1* 6/2023 Rastegardoost ...... H04L 1/1854 370/329
2023/0209538 A1* 6/2023 Cirik ..................... H04W 72/231 370/329
2023/0232408 A1* 7/2023 Takahashi ........... H04W 72/566 370/329
2023/0261791 A1* 8/2023 Zhou ..................... H04L 1/1854 370/329
2023/0284218 A1* 9/2023 Chou ..................... H04W 72/0446 370/329
2023/0319813 A1* 10/2023 Yao ..................... H04L 1/1864 370/329
2023/0328728 A1* 10/2023 Wang ..................... H04W 76/20
2023/0344583 A1* 10/2023 Yi ..................... H04L 5/0053
2023/0354435 A1* 11/2023 He ..................... H04W 72/232
2023/0371039 A1* 11/2023 Tsai ..................... H04W 72/232
2023/0422273 A1* 12/2023 Ye ..................... H04L 1/1887
2024/0007228 A1* 1/2024 Wu ..................... H04W 72/20
2024/0031010 A1* 1/2024 Ye ..................... H04L 5/0091
2024/0032025 A1* 1/2024 Gao ..................... H04W 72/232
2024/0032031 A1* 1/2024 Yi ..................... H04W 72/1273
2024/0040587 A1* 2/2024 Rastegardoost .... H04W 72/232
2024/0048295 A1* 2/2024 Choi ..................... H04L 1/1893
2024/0064764 A1* 2/2024 Yamamoto ........ H04W 72/0446
2024/0072974 A1* 2/2024 Fei ..................... H04W 72/0446
2024/0072975 A1* 2/2024 Rastegardoost ...... H04W 72/20
2024/0080224 A1* 3/2024 Sun ..................... H04B 7/18513
2024/0121764 A1* 4/2024 Liu ..................... H04W 72/0446
2024/0137952 A1* 4/2024 Li ..................... H04W 72/232
2024/0147438 A1* 5/2024 Xiong ..................... H04W 72/12
2024/0179692 A1* 5/2024 Xiong ..................... H04W 72/0446
2024/0188077 A1* 6/2024 Ye ..................... H04W 72/11
2024/0195534 A1* 6/2024 Wang ..................... H04L 1/1812
2024/0204931 A1* 6/2024 Xiong ..................... H04L 5/0053
2024/0224303 A1* 7/2024 Guo ..................... H04L 1/08
2024/0236973 A1* 7/2024 Zhang ..................... H04L 5/00
2024/0260023 A1* 8/2024 Park ..................... H04W 72/51
2024/0260036 A1* 8/2024 Jiang ..................... H04L 1/1812
2024/0314771 A1* 9/2024 Guo ..................... H04W 72/1268
2024/0314777 A1* 9/2024 Bhamri ..................... H04L 1/08
2024/0397526 A1* 11/2024 Jiang ..................... H04L 1/08
2024/0405928 A1* 12/2024 Lei ..................... H04L 1/1614
2024/0406936 A1* 12/2024 Lee ..................... H04L 1/0003
2024/0430969 A1* 12/2024 Gao ..................... H04B 7/06964
2025/0008526 A1* 1/2025 Herath ..................... H04W 72/563
2025/0016605 A1* 1/2025 Lee ..................... H04W 72/543
2025/0047421 A1* 2/2025 Lee ..................... H04L 1/1854
2025/0133568 A1* 4/2025 Matsumura ............... H04L 1/08
2025/0158758 A1* 5/2025 Bagheri ..................... H04L 1/1896
2025/0158782 A1* 5/2025 Sun ..................... H04L 5/0055
2025/0184992 A1* 6/2025 Harada ..................... H04L 1/18
2025/0227738 A1* 7/2025 Hoang ..................... H04L 1/1893
2025/0286673 A1* 9/2025 Su ..................... H04L 5/0094

OTHER PUBLICATIONS

Apple Inc: "Discussion on PDSCH and PUSCH Enhancements for NR above 52.6 GHz", 3GPP TSG RAN WG1 #106b-e, R1-2107730, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038617, 39 Pages, paragraph [05.3] paragraph [10.4], figure 9, section 6.1, sections 1-10.
International Search Report and Written Opinion—PCT/US2023/015898—ISA/EPO—Jun. 28, 2023.

* cited by examiner

MULTI-SHARED CHANNEL SCHEDULING FOR EXTENDED REALITY

CROSS REFERENCE

The present application for patent claims the benefit of U.S. Provisional Patent Application No. 63/332,545 by XU et al., entitled "MULTI-SHARED CHANNEL SCHEDULING FOR EXTENDED REALITY," filed Apr. 19, 2022, assigned to the assignee hereof, and expressly incorporated by reference herein.

FIELD OF TECHNOLOGY

The following relates to wireless communications, including multi-shared channel scheduling for extended reality (XR).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-shared channel scheduling for extended reality (XR). For example, the described techniques provide for scheduling multiple shared channels for XR data transmissions in a same downlink control information (DCI). In some examples, a network entity may schedule the multiple shared channels (e.g., physical downlink shared channels (PDSCHs), physical uplink shared channels (PUSCHs)) using parameters corresponding to time domain resource allocation (TDRA) information for each shared channel, where the parameters may be included in a TDRA table. In some cases, the network entity may transmit a first message to a user equipment (UE), which may be an XR device or otherwise support XR communications. The first message may indicate a first set of parameters associated with TDRA information in a TDRA table, the first set of parameters for a first quantity of shared channels (e.g., some maximum or threshold quantity of shared channels). Each row of the TDRA table may indicate one or more parameters for the first quantity of shared channels. The network entity may transmit DCI scheduling a set of shared channels including a first subset of shared channels (e.g., the first quantity of shared channels) and a second subset of shared channels (e.g., one or more additional shared channels). That is, the set of shared channels may include more shared channels than the first quantity of shared channels, and as such, the second subset of shared channels may be initially excluded from the TDRA table indicated in the first message (e.g., due to the quantity of scheduled channels exceeding the available parameter sets indicated by the TDRA table).

The UE may derive a second set of parameters for the second subset of shared channels based on the first set of parameters. For example, instead of adding one or more rows to the TDRA table for the additional shared channels, the UE may determine the second set of parameters using the first set of parameters and a scheduling offset, or based on an indication from the network entity, among other examples. In some examples, the UE and the network entity may communicate the first subset of shared channels using the first set of parameters and the second subset of shared channels using the second set of parameters. As such, the network entity may use a single DCI to schedule the first quantity of shared channels and one or more additional shared channels without increasing system overhead and to increase scheduling efficiency, among other benefits.

A method for wireless communication at a UE is described. The method may include receiving a first message indicating a first set of multiple parameters associated with TDRA information for a first quantity of shared channels, receiving a second message scheduling a set of shared channels, where a second quantity of the set of shared channels exceeds the first quantity of shared channels, and communicating a first subset of shared channels of the set of shared channels based on the first set of multiple parameters and a second subset of shared channels of the set of shared channels using a second set of multiple parameters determined based on the first set of multiple parameters.

An apparatus for wireless communication at a UE is described. The apparatus may include a processor, memory coupled with the processor, and instructions stored in the memory. The instructions may be executable by the processor to cause the apparatus to receive a first message indicating a first set of multiple parameters associated with TDRA information for a first quantity of shared channels, receive a second message scheduling a set of shared channels, where a second quantity of the set of shared channels exceeds the first quantity of shared channels, and communicate a first subset of shared channels of the set of shared channels based on the first set of multiple parameters and a second subset of shared channels of the set of shared channels using a second set of multiple parameters determined based on the first set of multiple parameters.

Another apparatus for wireless communication at a UE is described. The apparatus may include means for receiving a first message indicating a first set of multiple parameters associated with TDRA information for a first quantity of shared channels, means for receiving a second message scheduling a set of shared channels, where a second quantity of the set of shared channels exceeds the first quantity of shared channels, and means for communicating a first subset of shared channels of the set of shared channels based on the first set of multiple parameters and a second subset of shared channels of the set of shared channels using a second set of multiple parameters determined based on the first set of multiple parameters.

A non-transitory computer-readable medium storing code for wireless communication at a UE is described. The code may include instructions executable by a processor to receive a first message indicating a first set of multiple parameters associated with TDRA information for a first quantity of shared channels, receive a second message scheduling a set of shared channels, where a second quantity of the set of shared channels exceeds the first quantity of shared channels, and communicate a first subset of shared channels of the set of shared channels based on the first set of multiple parameters and a second subset of shared channels of the set of shared channels using a second set of multiple parameters determined based on the first set of multiple parameters.

Some examples of the method, apparatuses, and non-transitory computer-readable medium described herein may further include operations, features, means, or instructions for receiving a control message indicating a number for incrementing a scheduling offset associated with the first subset of shared channels and generating one or more scheduling offsets for the second subset of shared channels based on incrementing the scheduling offset associated with the first subset of shared channels by the indicated number.

Some examples of the method, apparatuses, and non-transitory computer-readable medium described herein may further include operations, features, means, or instructions for generating one or more respective scheduling offsets in accordance with one or more repetition values indicated by the control message, the one or more repetition values indicating one or more numbers for incrementing the scheduling offset associated with the first subset of shared channels.

Some examples of the method, apparatuses, and non-transitory computer-readable medium described herein may further include operations, features, means, or instructions for generating the second set of multiple parameters based on the first set of multiple parameters and one or more row offsets associated with the first set of multiple parameters.

Some examples of the method, apparatuses, and non-transitory computer-readable medium described herein may further include operations, features, means, or instructions for receiving a control message indicating TDRA information associated with the second subset of shared channels and generating the second set of multiple parameters based on the control message, where one or more parameters of the second set of multiple parameters may be the same as one or more parameters of the first set of multiple parameters.

Some examples of the method, apparatuses, and non-transitory computer-readable medium described herein may further include operations, features, means, or instructions for receiving a DCI message including at least one bit indicating the second set of multiple parameters.

Some examples of the method, apparatuses, and non-transitory computer-readable medium described herein may further include operations, features, means, or instructions for determining the first set of multiple parameters and the second set of multiple parameters, where the first set of multiple parameters and the second set of multiple parameters each includes a mapping type, a start symbol, a quantity of consecutive symbols, or any combination thereof.

Some examples of the method, apparatuses, and non-transitory computer-readable medium described herein may further include operations, features, means, or instructions for determining the second set of multiple parameters based on a lookup table, where the lookup table indicates one of the first set of multiple parameters or parameters that may be based on the second quantity of the set of shared channels exceeding the first quantity of shared channels.

Some examples of the method, apparatuses, and non-transitory computer-readable medium described herein may further include operations, features, means, or instructions for receiving a third message indicating an association between the set of shared channels and a same data unit received at the UE.

In some examples of the method, apparatuses, and non-transitory computer-readable medium described herein, the association may be based on a search space set associated with scheduling of the set of shared channels, a control resource set associated with scheduling of the set of shared channels, or both.

Some examples of the method, apparatuses, and non-transitory computer-readable medium described herein may further include operations, features, means, or instructions for receiving the third message indicating cancellation of communications of at least one shared channel of a third subset of shared channels of the set of shared channels and dropping the third subset of shared channels of the set of shared channels based on the third message and the association between the set of shared channels and the same data unit received at the UE.

In some examples of the method, apparatuses, and non-transitory computer-readable medium described herein, the third message may be specific to the UE.

Some examples of the method, apparatuses, and non-transitory computer-readable medium described herein may further include operations, features, means, or instructions for receiving the third message scheduling a second set of shared channels and dropping a third subset of shared channels of the set of shared channels based on receiving the third message.

In some examples of the method, apparatuses, and non-transitory computer-readable medium described herein, receiving the third message may include operations, features, means, or instructions for receiving the third message scheduling the second set of shared channels in a duration that at least partially overlaps with a scheduled duration of the third subset of shared channels.

In some examples of the method, apparatuses, and non-transitory computer-readable medium described herein, the first subset and the second subset may be communicated in accordance with a set of multiple subcarrier spacing (SCS) configurations.

Some examples of the method, apparatuses, and non-transitory computer-readable medium described herein may further include operations, features, means, or instructions for transmitting a capability message indicating a capability of the UE to receive the first set of multiple parameters for a set of multiple SCS configurations.

In some examples of the method, apparatuses, and non-transitory computer-readable medium described herein, the set of shared channels includes more than eight shared channels.

In some examples of the method, apparatuses, and non-transitory computer-readable medium described herein, receiving the second message may include operations, features, means, or instructions for receiving the second message indicating a new data indicator (NDI), a redundancy version (RV) field, or both, where the NDI and the RV field each include a quantity of bits based on the second quantity of shared channels.

Some examples of the method, apparatuses, and non-transitory computer-readable medium described herein may further include operations, features, means, or instructions for receiving a control message indicating that an RV of an RV field may be used for a retransmission of the set of shared channels by the UE, where the second message excludes the RV field.

A method for wireless communication at a network entity is described. The method may include transmitting a first message indicating a first set of multiple parameters associated with TDRA information for a first quantity of shared channels, transmitting a second message scheduling a set of shared channels, where a second quantity of the set of shared channels exceeds the first quantity of shared channels, and communicating a first subset of the set of shared channels based on the first set of multiple parameters and a second subset of shared channels of the set of shared channels using a second set of multiple parameters determined based on the first set of multiple parameters.

An apparatus for wireless communication at a network entity is described. The apparatus may include a processor, memory coupled with the processor, and instructions stored in the memory. The instructions may be executable by the processor to cause the apparatus to transmit a first message indicating a first set of multiple parameters associated with TDRA information for a first quantity of shared channels, transmit a second message scheduling a set of shared channels, where a second quantity of the set of shared channels exceeds the first quantity of shared channels, and communicate a first subset of the set of shared channels based on the first set of multiple parameters and a second subset of shared channels of the set of shared channels using a second set of multiple parameters determined based on the first set of multiple parameters.

Another apparatus for wireless communication at a network entity is described. The apparatus may include means for transmitting a first message indicating a first set of multiple parameters associated with TDRA information for a first quantity of shared channels, means for transmitting a second message scheduling a set of shared channels, where a second quantity of the set of shared channels exceeds the first quantity of shared channels, and means for communicating a first subset of the set of shared channels based on the first set of multiple parameters and a second subset of shared channels of the set of shared channels using a second set of multiple parameters determined based on the first set of multiple parameters.

A non-transitory computer-readable medium storing code for wireless communication at a network entity is described. The code may include instructions executable by a processor to transmit a first message indicating a first set of multiple parameters associated with TDRA information for a first quantity of shared channels, transmit a second message scheduling a set of shared channels, where a second quantity of the set of shared channels exceeds the first quantity of shared channels, and communicate a first subset of the set of shared channels based on the first set of multiple parameters and a second subset of shared channels of the set of shared channels using a second set of multiple parameters determined based on the first set of multiple parameters.

Some examples of the method, apparatuses, and non-transitory computer-readable medium described herein may further include operations, features, means, or instructions for transmitting a control message indicating a number for incrementing a scheduling offset associated with the first subset of shared channels.

Some examples of the method, apparatuses, and non-transitory computer-readable medium described herein may further include operations, features, means, or instructions for transmitting a control message indicating TDRA information associated with the second subset of shared channels.

Some examples of the method, apparatuses, and non-transitory computer-readable medium described herein may further include operations, features, means, or instructions for transmitting a DCI message including at least one bit indicating the second set of multiple parameters.

In some examples of the method, apparatuses, and non-transitory computer-readable medium described herein, the first set of multiple parameters and the second set of multiple parameters each includes a mapping type, a start symbol, a quantity of consecutive symbols, or any combination thereof.

Some examples of the method, apparatuses, and non-transitory computer-readable medium described herein may further include operations, features, means, or instructions for transmitting a third message indicating an association between the set of shared channels and a same data unit received at a UE.

In some examples of the method, apparatuses, and non-transitory computer-readable medium described herein, the association may be based on a search space set associated with scheduling of the set of shared channels, a control resource set associated with scheduling of the set of shared channels, or both.

Some examples of the method, apparatuses, and non-transitory computer-readable medium described herein may further include operations, features, means, or instructions for transmitting the third message indicating cancellation of communications of at least one shared channel of a third subset of shared channels of the set of shared channels.

In some examples of the method, apparatuses, and non-transitory computer-readable medium described herein, the third message may be specific to the UE.

Some examples of the method, apparatuses, and non-transitory computer-readable medium described herein may further include operations, features, means, or instructions for transmitting the third message scheduling a second set of shared channels.

In some examples of the method, apparatuses, and non-transitory computer-readable medium described herein, transmitting the third message may include operations, features, means, or instructions for transmitting the third message scheduling the second set of shared channels in a duration that at least partially overlaps with a scheduled duration of a third subset of shared channels.

In some examples of the method, apparatuses, and non-transitory computer-readable medium described herein, the first subset and the second subset may be communicated in accordance with a set of multiple SCS configurations.

Some examples of the method, apparatuses, and non-transitory computer-readable medium described herein may further include operations, features, means, or instructions for receiving a capability message indicating a capability of a UE to receive the first set of multiple parameters for a set of multiple SCS configurations.

In some examples of the method, apparatuses, and non-transitory computer-readable medium described herein, the set of shared channels includes more than eight shared channels.

In some examples of the method, apparatuses, and non-transitory computer-readable medium described herein, transmitting the second message may include operations, features, means, or instructions for transmitting the second message indicating an NDI, an RV field, or both, where the NDI and the RV field each include a quantity of bits based on the second quantity of shared channels.

Some examples of the method, apparatuses, and non-transitory computer-readable medium described herein may further include operations, features, means, or instructions for excluding an RV of an RV field from the second message based on the second quantity of shared channels exceeding the first quantity of shared channels and transmitting a control message indicating that the RV may be used for a retransmission of the set of shared channels by a UE.

DETAILED DESCRIPTION

Figure 1:
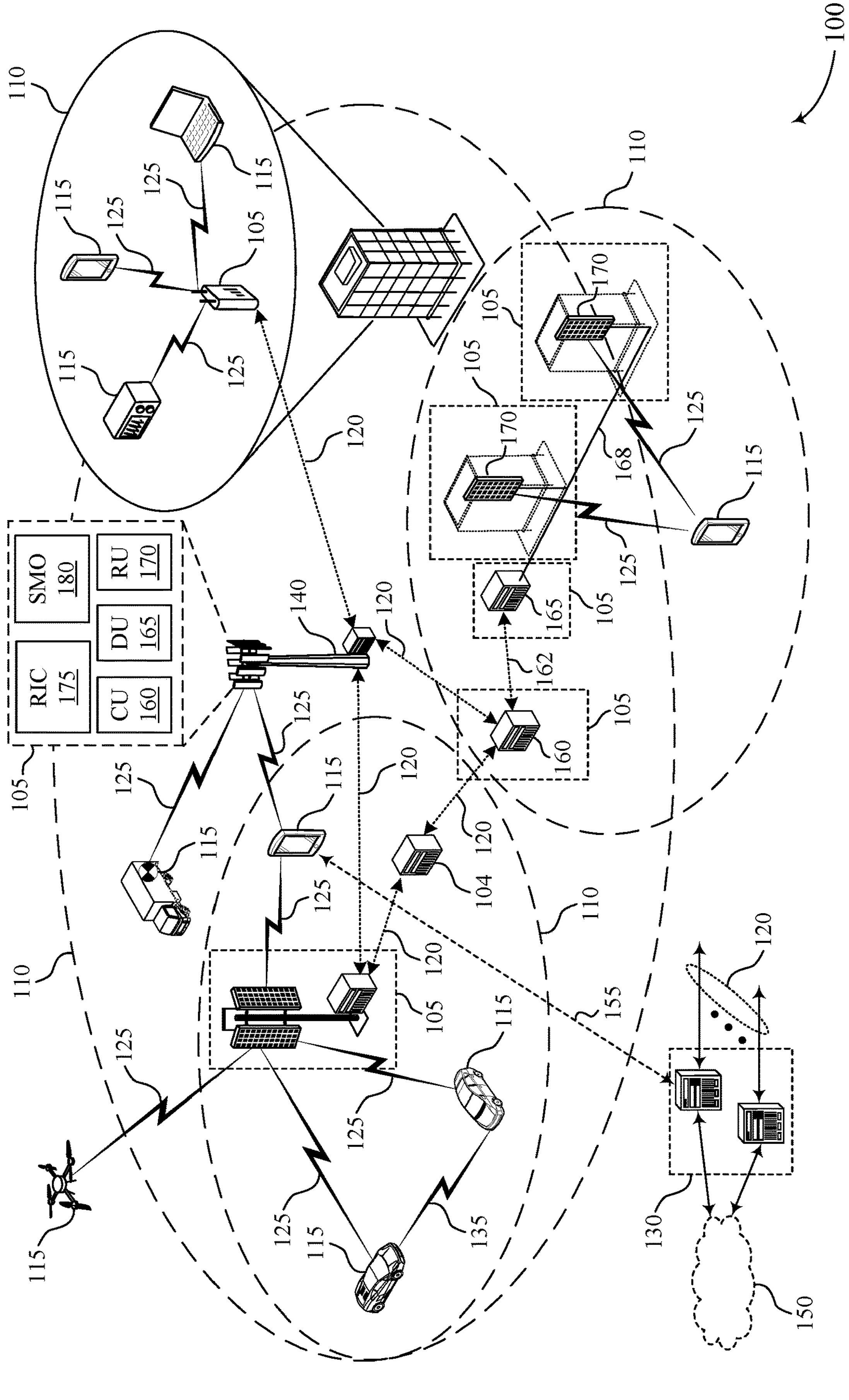
FIG. 1 illustrates an example of a wireless communications system that supports multi-shared channel scheduling for extended reality (XR) in accordance with one or more aspects of the present disclosure.

Extended reality (XR) data in a wireless communications system may include virtual reality (VR) data, augmented reality (AR) data, mixed reality (MR) data, and other types of data associated with high reliability and low latency transmissions. In some examples, a network entity may transmit XR video frame data to user equipments (UEs) (e.g., XR users, XR devices, or other devices that support XR communications), where variable frame sizes of the video frame data may cause jitter in the transmissions. For example, a particular delay between an arrival time of the video frame data at a UE and decoding of the video frame data at the UE may result in jitter or dropped transmissions. In some examples, to improve the quality and reliability of XR data transmissions, the network entity may use dynamic signaling (e.g., downlink control information (DCI)) to indicate an arrival time of the video frame data at the UE and to indicate one or more shared channels over which the video frame data may be transmitted. The network entity may use the same DCI to schedule multiple downlink and uplink shared channels to transmit the video frame data. However, the DCI scheduling of multiple shared channel may be limited to particular shared channels, which may reduce scheduling efficiency and increase overhead.

Techniques described herein provide for scheduling multiple shared channels for XR data transmissions using same DCI. In some examples, a network entity may schedule the multiple shared channels (e.g., physical downlink shared channels (PDSCHs), physical uplink shared channels (PUSCHs)) using parameters corresponding to time resources such as time domain resource allocation (TDRA) information for each shared channel. The parameters may be included in a TDRA table. In some cases, the network entity may transmit a first message to a UE indicating a first set of parameters associated with TDRA information in a TDRA table, the first set of parameters for a first quantity of shared channels (e.g., some maximum quantity of shared channels). Each row of the TDRA table may indicate a combination of parameters for the first quantity of shared channels. The network entity may transmit DCI scheduling a set of shared channels, the set including a first subset of shared channels (e.g., the first quantity of shared channels) and a second subset of shared channels (e.g., one or more additional shared channels). That is, the set of shared channels may include more shared channels than the first quantity of shared channels, and as such, the second subset of shared channels may be initially excluded from the TDRA table indicated in the first message.

The UE may derive a second set of parameters for the second subset of shared channels based on the first set of parameters. For example, instead of adding one or more rows to the TDRA table for the additional shared channels, the UE may determine the second set of parameters using the first set of parameters and a scheduling offset, or based on an indication from the network entity, among other examples. In some examples, the UE and the network entity may communicate the first subset of shared channels using the first set of parameters and the second subset of shared channels using the second set of parameters. As such, the network entity may use a single DCI to schedule the first quantity of shared channels and one or more additional shared channels without increasing system overhead and to increase scheduling efficiency, among other benefits.

In some examples, the network entity may use the same DCI to schedule the set of shared channels (e.g., including the first quantity of shared channels and the one or more additional shared channels) according to multiple subcarrier spacing (SCS) configurations or based on a capability of the UE. In addition, the network entity may indicate a new data indicator (NDI), a redundancy version (RV) field, or both via the DCI, where a quantity of bits used to indicate each of the NDI and RV field may be based on the quantity of additional shared channels being scheduled. In some examples, the network entity may configure the UE to associate the additional shared channels with a same data unit (e.g., a same video frame), and in some cases, the UE may cancel or drop one or more of the additional shared channels if any one of the shared channels associated with the same data unit are canceled or dropped.

Aspects of the disclosure are initially described in the context of wireless communications systems. Aspects of the disclosure are then described in the context of resource allocations, transmission schemes, and process flows. Aspects of the disclosure are further illustrated by and described with reference to apparatus diagrams, system diagrams, and flowcharts that relate to multi-shared channel scheduling for XR.

FIG. 1 illustrates an example of a wireless communications system 100 that supports multi-shared channel scheduling for XR in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-shared channel scheduling for XR as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and SCS may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Some UEs 115 may be XR devices that support XR data communications. XR data may include VR, AR, and MR data and may be associated with relatively higher-capability devices that perform time-critical communications. In some examples, XR downlink throughput may include video frame data transmissions, where individual video frames may be relatively large in size (e.g., a data size associated with an individual video frame may exceed a threshold size or may be some factor greater than non-video frame communications). A network entity 105 may periodically transmit video frame data to one or more UEs 115 (e.g., XR devices), where the arrival time of each video frame may be subject to random jittering (up to a few milliseconds) based on a respective frame size of each video frame. In addition, video frames may have variable frame sizes subject to a compression algorithm, and as such, the network entity 105 may transmit one video frame in multiple transport blocks in multiple slots. For example, AR or VR transmissions of 30 Mbps may have a minimum packet size of 31250 bytes, a maximum packet size of 93750 bytes, and a mean packet size of 62500 bytes, which may use 5, 10, and 15 slots, respectively, for a 100 MHz bandwidth, 30 kHz SCS, 16 quadrature amplitude modulation (QAM), and 1/3 code rate transmission. As such, there may be a limited delay budget for XR video frame transmissions (e.g., for AR and VR transmissions, the delay budget may be 10 ms between the video frame data arriving at a network entity 105 and the video frame data being successfully transmitted to a UE 115).

Due to the variable frame sizes and jitter of video frame data, the network entity 105 may use dynamic signaling (e.g., a scheduling DCI) to indicate a quantity of slots configured to transmit the video frame data and an arrival time of the video frame data. For example, the network entity 105 may schedule multiple shared channel transmissions (e.g., one or more PDSCHs, PUSCHs, or both) using a single DCI, which may reduce power consumption at the UE 115 (e.g., an XR device) by increasing scheduling efficiency and reducing signaling overhead. In some examples, a quantity of shared channels scheduled by a same DCI may be based on a quantity of time domain resources allocated to a UE 115 in a corresponding row of a configured TDRA table (e.g., a corresponding entry in an RRC configuration message for the TDRA table). For example, the DCI may indicate a time domain resource assignment field as a row index for a row of the TDRA table. Each row of the TDRA table may include one or more combinations of parameters for each PDSCH or each PUSCH scheduled via the DCI.

The parameters may include a mapping type, a scheduling offset (e.g., K0 for PDSCHs or K2 for PUSCHs), a start symbol, a quantity of consecutive symbols within a slot in which the shared channels are scheduled, or any combination thereof. A start symbol and a quantity of consecutive symbols may together represent a start and length indicator value (SLIV), and the scheduling offset may represent an offset between a slot in which the DCI is received at the UE 115 and a slot in which a respective shared channel is scheduled. For example, a first row of the TDRA table may indicate a first PDSCH mapping type of Type A, a scheduling offset K0 of 0, a starting symbol (e.g., S) of 2, and a quantity of consecutive symbols (e.g., L) of 6 and a second PDSCH mapping type of Type B, a scheduling offset K0 of 1, a starting symbols of 2, and a quantity of consecutive symbols of 10.

In some examples, each row of the TDRA table may include one combination of parameters for one or more shared channels scheduled by a same DCI. Alternatively, each row of the TDRA table may include multiple combinations of the parameters for the one or more shared channels. In some cases, each row of the TDRA table may indicate multiple shared channels in consecutive or non-consecutive slots. Accordingly, the network entity 105 may configure the TDRA table with one or more combinations of parameters to provide scheduling flexibility for video frame data transmissions.

The wireless communications system 100 may support techniques for scheduling multiple shared channels for XR data transmissions using same DCI. In some examples, a network entity 105 may schedule the multiple shared channels (e.g., one or more PDSCHs, PUSCHs, or both) using parameters corresponding to TDRA information for each shared channel, which may be included in a TDRA table. In some cases, the network entity 105 may transmit a first message to a UE 115 indicating a first set of parameters associated with TDRA information in a TDRA table, the first set of parameters for a first quantity of shared channels (e.g., some maximum quantity of shared channels). Each row of the TDRA table may indicate a combination of parameters for the first quantity of shared channels. The network entity 105 may transmit DCI scheduling a set of shared channels, the set including a first subset of shared channels (e.g., the first quantity of shared channels) and a second subset of shared channels (e.g., one or more additional shared channels). That is, the set of shared channels may include more shared channels than the first quantity of shared channels, and as such, the second subset of shared channels may be initially excluded from the TDRA table indicated in the first message.

The UE 115 may derive a second set of parameters for the second subset of shared channels based on the first set of parameters. For example, instead of adding one or more combinations of parameters to one or more rows in the TDRA table for the additional shared channels, the UE 115 may determine the second set of parameters using the first set of parameters and a scheduling offset, or based on an indication from the network entity 105, among other examples. In some examples, the UE 115 and the network entity 105 may communicate the first subset of shared channels using the first set of parameters and the second subset of shared channels using the second set of parameters. As such, the network entity 105 may use a single DCI to schedule the first quantity of shared channels and one or more additional shared channels without increasing system overhead and to increase scheduling efficiency, among other benefits.

Figure 2:
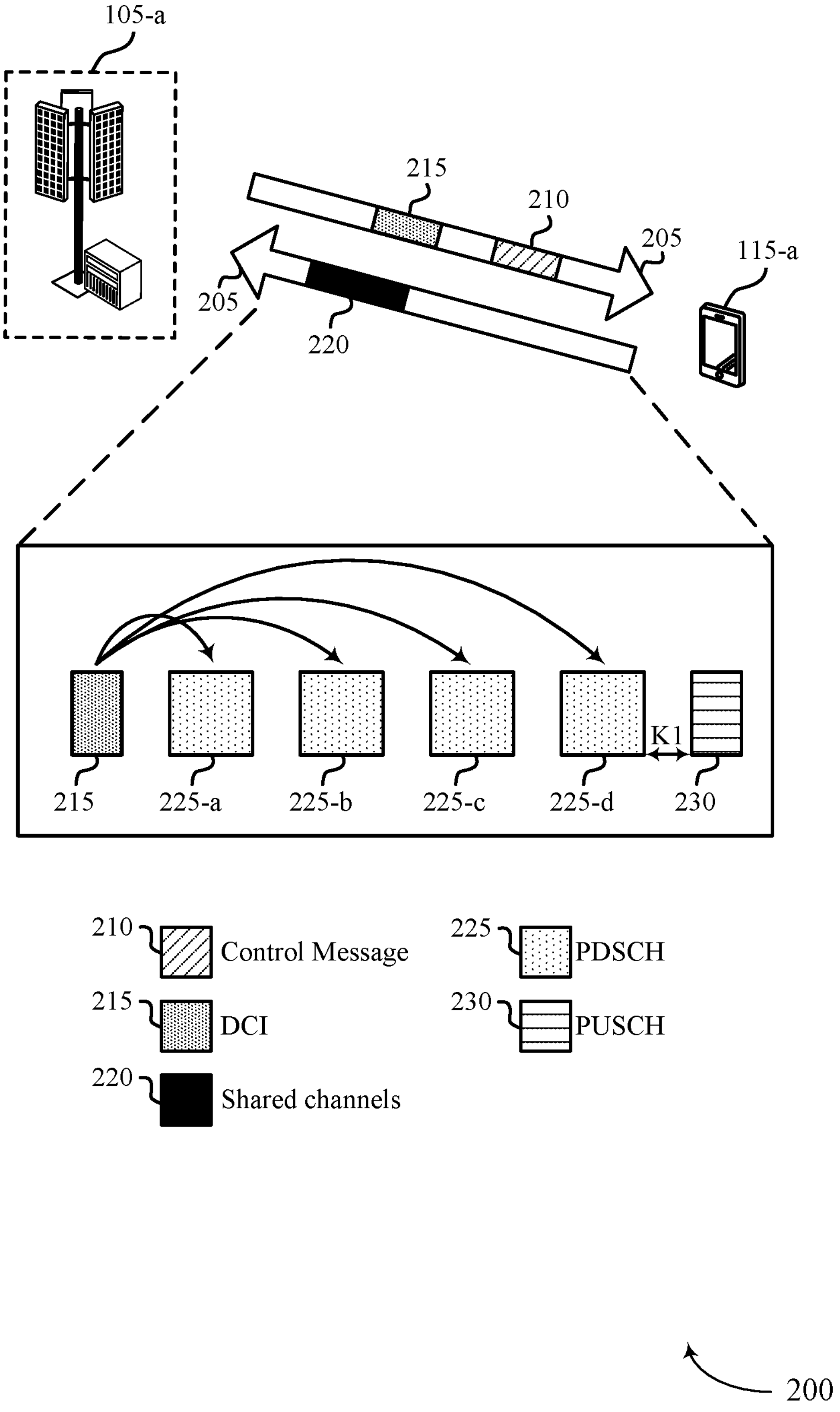
FIG. 2 illustrates an example of a wireless communications system that supports multi-shared channel scheduling for XR in accordance with one or more aspects of the present disclosure.

FIG. 2 illustrates an example of a wireless communications system 200 that supports multi-shared channel scheduling for XR in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices described herein. In some examples, the network entity 105-*a* may use a same DCI to schedule multiple shared channels (e.g., PDSCHs 225, PUSCHs 230, or both), which may increase scheduling efficiency and decrease system overhead in the wireless communications system 200, among other benefits.

The wireless communications system 200 may support communications between the network entity 105-*a* and the UE 115-*a*. For example, the network entity 105-*a* may communicate (uplink and downlink messages) with the UE 115-*a* over respective communication links 205, which may be examples of communication links 125 described with reference to FIG. 1. In some examples, the communication links 205 may facilitate respective shared channel transmissions. For example, the network entity 105-*a* may transmit a PDSCH 225 to the UE 115-*a* via a communication link 205, and the UE 115-*a* may transmit a PUSCH 230 to the network entity 105-*a* via a communication link 205. In some examples, the UE 115-*a* may be an XR device that supports XR, AR, VR, and other MR communications. For example, the network entity 105-*a* may transmit video frame data to the UE 115-*a*, the video frame data associated with a relatively small delay budget (e.g., associated with low latency communications or having a latency target below a threshold) and a relatively large data size (e.g., having a data size above a threshold).

To support multi-shared channel scheduling for XR video frame data, the network entity 105-*a* may transmit a control message 210 (e.g., a first message) to the UE 115-*a* via a communication link 205. The control message 210 may be a control message (e.g., an RRC configuration message) that indicates a first set of parameters associated with TDRA information for a first quantity of shared channels (e.g., PDSCHs 225, PUSCHs 230, or both). The first quantity may correspond to a maximum quantity of shared channels. In some cases, the TDRA information may be indicated in a TDRA table, where each row of the TDRA table may include one or more combinations of parameters for the first quantity of shared channels. That is, each row of the TDRA table may indicate time domain resources allocated to the first quantity of shared channels based on the first set of parameters.

In some examples, the network entity 105-*a* may transmit DCI 215 (e.g., a second message) to the UE 115-*a* and via the communication link 205. The DCI 215 may schedule a set of shared channels, where a quantity of shared channels in the set of shared channels exceeds the first quantity of shared channels. That is, the set of shared channels may include a first subset of shared channels (e.g., the first quantity of shared channels) and a second subset of shared channels (e.g., one or more additional shared channels), such that the set of shared channels includes more shared channels than were included in the first quantity. In addition, the additional shared channels included in the second subset may be initially excluded from the TDRA table indicated in the control message 210. Accordingly, the DCI 215 may schedule the first quantity of shared channels and the one or more additional shared channels via the same DCI (e.g., the DCI 215).

In response to communicating the DCI 215, the network entity 105-*a* and the UE 115-*a* may communicate shared channels 220, which may include one or more PDSCHs 225, one or more PUSCHs 230, or both. For example, the shared channels 220 may include the first subset of shared channels and the second subset of shared channels. In some examples, the network entity 105-*a* may communicate the first subset of shared channels based on the first set of parameters included in the TDRA table. In addition, the network entity 105-*a* may communicate the second subset of shared channels using a second set of parameters derived from the first set of parameters (e.g., as the second set of parameters may be initially excluded from the TDRA table). That is, instead of adding one or more additional combinations of parameters to one or more rows in the TDRA table to indicate the second set of parameters for the second subset of shared channels, which may increase overhead as the TDRA table may be larger, the network entity 105-*a* may use the existing TDRA information for the first subset of shared channels to determine the second set of parameters. In some examples, the parameters in the first and second sets of parameters may include a mapping type, a start symbol and a quantity of consecutive symbols within a slot in which the shared channels are scheduled (e.g., a SLIV), a scheduling offset (e.g., K0 for PDSCHs 225, K2 for PUSCHs 230), or any combination thereof.

In some cases, the UE 115-*a* may implicitly generate additional combinations of parameters and corresponding TDRA information in the TDRA table based on a set of rules. For example, the UE 115-*a* may receive control information (e.g., an RRC message) from the network entity 105-*a* indicating a number for incrementing a scheduling offset associated with the first subset of shared channels (e.g., the first quantity of shared channels). For each combination of parameters in a given row of the TDRA table, the UE 115-*a* may generate one or more scheduling offsets for the second subset of shared channels (e.g., the additional shared channels) by reusing the first set of parameters and by incrementing the scheduling offset (e.g., K0 for PDSCHs 225, K2 for PUSCHs 230) by the indicated number (e.g., a default value of one slot).

Alternatively, the UE 115-*a* may determine the second set of parameters based on the first set of parameters and one or more row offsets associated with the first set of parameters. For example, the UE 115-*a* may repeat a row of the TDRA table and create a time domain resource for each shared channel of the second subset of shared channels based on the parameters of the first combination in the row after the time domain resource for the last combination in the row with an offset between them, and so on. In some examples, the UE 115-*a* may receive a DCI message from the network entity 105-*a* that includes at least one bit indicating the second set of parameters. Additional details related to determining the second set of parameters are described with reference to FIG. 3.

Upon deriving the second set of parameters, the UE 115-*a* and the network entity 105-*a* may communicate the shared channels 220 using respective parameters. Accordingly, the network entity 105-*a* may schedule the shared channels 220 using the same DCI and without increasing the size of the TDRA table indicated in the control message 210. For example, the DCI 215 may schedule a PDSCH 225-*a*, a PDSCH 225-*b*, a PDSCH 225-*c*, and a PDSCH 225-*d*, where the PDSCHs 225 may be included in the first subset of shared channels or the second subset of shared channels. The PUSCH 230 may be scheduled an offset of K1 after the PDSCH 225-*d*.

To communicate the shared channels 220 using the respective first and second sets of parameters (e.g., without adding rows to the TDRA table for the second set of shared channels), the network entity 105-*a* may configure the TDRA table to include more than a threshold quantity (e.g., eight) of combinations of parameters in at least one row of the TDRA table. The UE 115-*a* may determine the first and second sets of parameters based on the TDRA table (e.g., a lookup table), where the TDRA table may indicate one of the first set of parameters or parameters that are based on the second quantity of the set of shared channels exceeding the first quantity of shared channels. For example, the UE 115-*a* may reuse a particular table for PDSCHs 225 (e.g., dsch-TimeDomainResourceAllocationListForMultiPDSCH) and a different table for PUSCHs 230 (e.g., pusch-TimeDomainAllocationListForMultiPUSCH or pusch-TimeDomainResourceAllocationListForMultiPUSCH-r17), where one or more rows in each table may have additional combinations of parameters the UE 115-*a* may use as the second set of parameters for the second subset of shared channels. Additionally, or alternatively, the UE 115-*a* may define one or more tables for the PDSCHs 225 (e.g., dsch-TimeDomainResourceAllocationListForMultiPDSCH-r18) and the PUSCHs 230 (e.g., pusch-TimeDomainResourceAllocationListForMultiPUSCH-r18), which may indicate the second set of parameters.

The network entity 105-*a* and the UE 115-*a* may communicate the shared channels 220 in accordance with multiple SCS configurations. For example, the network entity 105-*a* may communicate one or more PDSCHs 225 of the shared channels 220 according to SCSs of 120 kHz, 480 kHz, and 960 kHz for a frequency range of 52.6 GHz to 71 GHz, and one or more PUSCHs 230 of the shared channels 220 according to any SCS for an unlicensed NR band (e.g., NR-U) with the frequency range of 52.6 GHz to 71 GHz. In addition, for XR communications, the network entity 105-*a* may communicate one or more PDSCHs 225 and PUSCHs 230 of the shared channels 220 according to any SCS configuration including SCSs of 15 kHz, 30 kHz, and 60 kHz, as XR communications may occur with any SCS configuration in the wireless communications system 200.

In some cases, the network entity 105-*a* may schedule the set of shared channels using the DCI 215 (e.g., the same DCI message) based on a capability of the UE 115-*a*. For example, the UE 115-*a* may transmit a capability message to the network entity 105-*a* indicating a capability of the UE 115-*a* to receive the control message 210 indicating the first set of parameters for multiple SCS configurations. In addition, the capability message may indicate which one or more SCSs among the SCSs of 15 kHz, 30 kHz, and 60 kHz the UE 115-*a* supports. As such, the UE 115-*a* may indicate whether it supports the network entity 105-*a* scheduling the set of shared channels using the DCI 215 for particular SCS configurations.

In addition, some XR communications may generate enough video frame data such that the network entity 105-*a* may increase a quantity of shared channels scheduled via the DCI 215 beyond a maximum quantity of shared channels (e.g., the first quantity). For example, to transmit AR or VR data at 30 Mbps, the network entity 105-*a* may use up to 15 slots with a 100 MHz bandwidth and a 30 kHz SCS, 16 QAM, and 1/3 code rate. To account for the relatively large data transmissions, the network entity 105-*a* may schedule more than eight shared channels. For example, the network entity 105-*a* may be configured to schedule up to sixteen shared channels.

In some examples, the DCI 215 may include one or more bits that indicate an NDI, an RV field, or both. For example, for each transport block in an XR transmission, the network entity 105-*a* may configure a quantity of bits for an NDI based on a maximum quantity of schedulable shared channels among shared channel entries in a configured TDRA table, where each transport block in each shared channel corresponds to one bit. In addition, for each transport block, the network entity 105-*a* may configure a quantity of bits for an RV field that may equal two if the DCI 215 lacks a configuration for multi-shared channel scheduling. Otherwise, the quantity of bits for the RV field may be based on the maximum quantity of schedulable shared channels among the shared channel entries in the configured TDRA table, where each transport block in each shared channel corresponds to one bit if multiple shared channels are scheduled via the DCI 215. In some cases, the network entity 105-*a* may configure more than eight bits for each of the NDI and the RV field in the DCI 215, and as such, the size of the DCI 215 may increase. For example, the network entity 105-*a* may schedule up to sixteen PDSCHs 225 in the DCI 215, which may increase the size of the DCI 215 to sixteen bits (e.g., from eight bits). For an XR data transmission with a limited delay budget, the network entity 105-*a* may perform at most one retransmission. As such, the network entity 105-*a* may refrain from using the RV, in which case the network entity 105-*a* may exclude the RV field from the DCI 215.

In some cases, the network entity 105-*a* may remove the RV field from the DCI 215 if a maximum quantity of schedulable shared channels via the DCI 215 is larger than eight. For example, the network entity 105-*a* may configure an RV for the retransmission of a PDSCH 225 that may be used when the NDI indicates that the PDSCH 225 is retransmitted. If the network entity 105-*a* indicates a retransmission of XR data in the NDI, the UE 115-*a* may use a fixed RV for the retransmission (e.g., at most one retransmission may be performed within a deadline of a delay budget of the XR data). As such, the UE 115-*a* may receive control information (e.g., an RRC message) from the network entity 105-*a* indicating an RV field in the DCI 215 that may otherwise be used for a retransmission of the set of shared channels by the UE 115-*a*, where the DCI 215 may exclude the RV field.

By scheduling the set of shared channels in a same DCI, communications between the UE 115-*a* and the network entity 105-*a* may be improved. For example, by deriving the second set of parameters from the first set of parameters instead of generating additional combinations of parameters to one or more rows in a TDRA table, the UE 115-*a* and the network entity 105-*a* may decrease overhead, which may result in power savings at the wireless devices. Additionally, scheduling the set of shared channels in the same DCI may increase scheduling efficiency, which may increase a reliability and efficiency of XR data transmissions, among other benefits.

Figure 3:
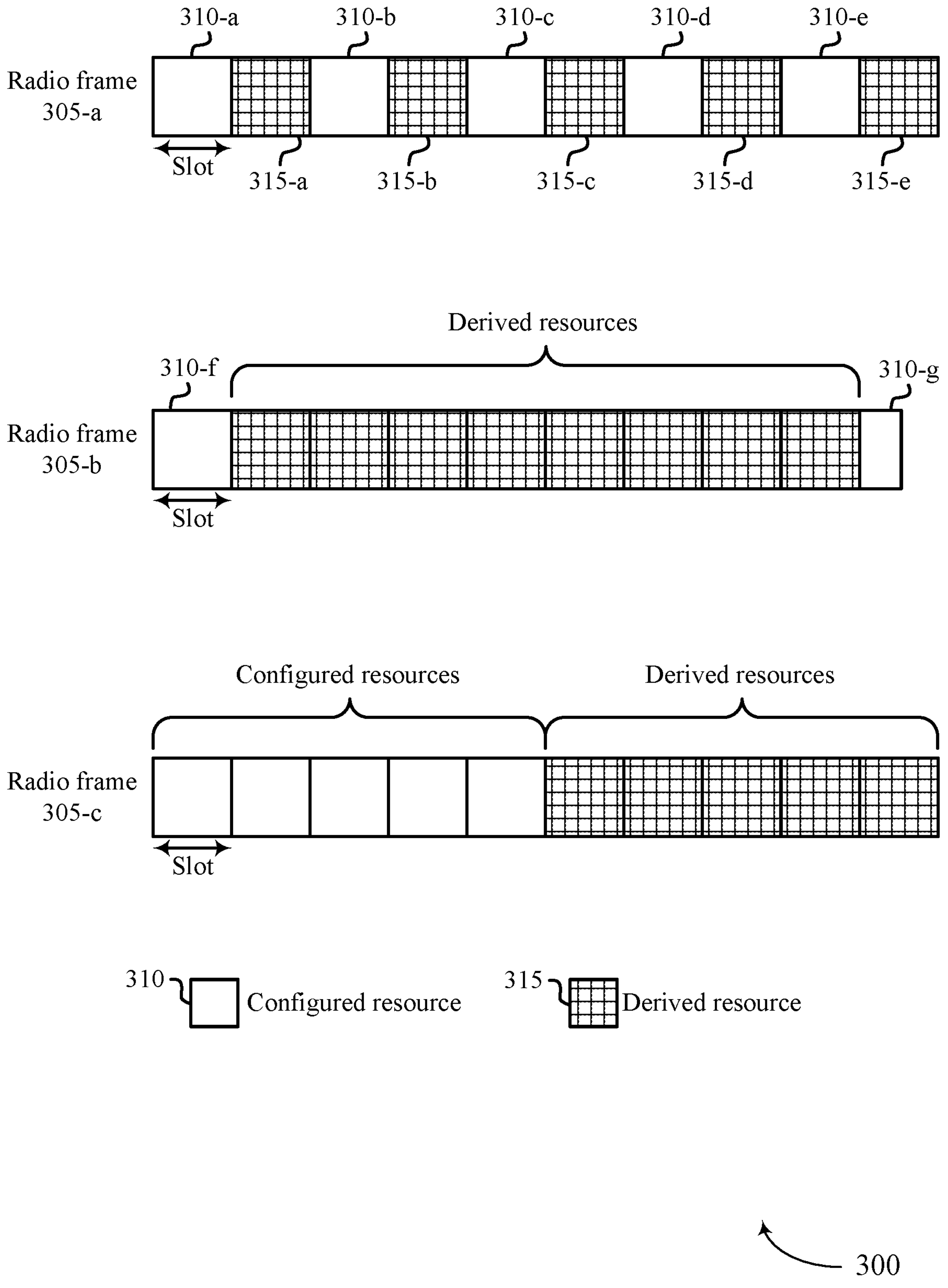
FIG. 3 illustrates an example of a resource allocation that supports multi-shared channel scheduling for XR in accordance with one or more aspects of the present disclosure.

FIG. 3 illustrates an example of a resource allocation 300 that supports multi-shared channel scheduling for XR in accordance with one or more aspects of the present disclosure. In some examples, the resource allocation 300 may implement aspects of the wireless communications systems 100 and 200 or may be implemented by aspects of the wireless communications systems 100 and 200. For example, a UE 115 and a network entity 105 may communicate a set of shared channels (e.g., a first subset of shared channels including a first quantity of shared channels, and a second subset of shared channels including one or more additional shared channels) in accordance with the resource allocation 300. The resource allocation 300 may include radio frames 305 including time domain resources corresponding to shared channels (e.g., PDSCHs and PUSCHs). The time domain resources may include configured resources 310 and derived resources 315.

To support multi-shared channel scheduling for XR video frame data, a network entity 105 may transmit a first message (e.g., a control message) to a UE 115 that indicates a first set of parameters associated with TDRA information for a first quantity of shared channels (e.g., corresponding to a maximum quantity of shared channels). In some cases, the TDRA information may be indicated in a TDRA table, where each row of the TDRA table may include one or more combinations of parameters for the first quantity of shared channels. That is, each row of the TDRA table may indicate time domain resources allocated to the first quantity of shared channels based on the first set of parameters.

In some examples, the network entity 105 may transmit a second message to the UE 115 including DCI that schedules a set of set of shared channels, where a quantity of shared channels in the set of shared channels exceeds the first quantity of shared channels. That is, the set of shared channels may include a first subset of shared channels (e.g., the first quantity of shared channels) and a second subset of shared channels (e.g., one or more additional shared channels), such that the set of shared channels includes more shared channels than were included in the first quantity. In addition, the additional shared channels included in the second subset may be initially excluded from the TDRA table indicated in the message. Accordingly, the second message may schedule the first quantity of shared channels and the one or more additional shared channels via the same DCI.

The network entity 105 and the UE 115 may communicate the first subset of shared channels using the first set of parameters indicated in the TDRA table. In addition, the network entity 105 and the UE 115 may communicate the second subset of shared channels using a second set of parameters derived from the first set of parameters (e.g., as the second set of parameters may be initially excluded from the TDRA table). That is, instead of adding one or more additional combinations of parameters to one or more rows in the TDRA table to indicate the second set of parameters for the second subset of shared channels, the network entity 105 may use the existing TDRA information for the first subset of shared channels to determine the second set of parameters. In some examples, the parameters in the first and second sets of parameters may include a mapping type, a start symbol and a quantity of consecutive symbols within a slot in which the shared channels are scheduled (e.g., a SLIV), a scheduling offset (e.g., K0 for PDSCHs, K2 for PUSCHs), or any combination thereof.

In some cases, the UE 115 may determine the second set of parameters by implicitly generating additional combinations of parameters and corresponding TDRA information in the TDRA table based on a set of rules. For example, the UE 115 may receive a control message (e.g., an RRC message) from the network entity 105 indicating a number for incrementing a scheduling offset associated with the first subset of shared channels (e.g., the first quantity of shared channels). For each combination of parameters in a given row of the TDRA table, the UE 115 may generate one or more scheduling offsets for the second subset of shared channels (e.g., the additional shared channels) by reusing the first set of parameters and incrementing the scheduling offset by the indicated number (e.g., a default value of one slot).

In an example of FIG. 3, a radio frame 305-*a* may indicate a quantity of time domain resources (e.g., slots) corresponding to PDSCHs scheduled by the network entity 105. For example, the first quantity of shared channels (e.g., 5 shared channels) may include a configured resource 310-*a*, a configured resource 310-*b*, a configured resource 310-*c*, a configured resource 310-*d*, and a configured resource 310-*e* in the radio frame 305-*a*. The configured resources 310 may correspond to the first set of parameters, where one or more combinations of the parameters in the first set of parameters may be indicated in a given row of the TDRA table. For example, the second message (e.g., including DCI) may indicate an index corresponding to a row of the TDRA table that includes the one or more combinations of the parameters. The row may indicate combinations of parameters corresponding to each configured resource 310 such that the network entity 105 may schedule PDSCHs associated with each configured resource 310. For example, a first entry in the row may correspond to the configured resource 310-*a*, a second entry in the row may correspond to the configured resource 310-*b*, and so on for the remaining configured resources 310 included in the radio frame 305-*a*. Each entry may indicate a respective SLIV for each configured resource 310. In addition, each configured resource 310 may have a scheduling offset, K0 (e.g., K0 for PDSCHs, K2 for PUSCHs).

The UE 115 may use the first set of parameters included in the row of the TDRA table for each configured resource 310 to determine a respective derived resource 315. Accordingly, the UE 115 may generate the second set of parameters for the second subset of shared channels (e.g., the additional shared channels) by reusing (e.g., duplicating) the first set of parameters and incrementing the scheduling offset by one. For example, if the control message from the network entity 105 indicates to increment the scheduling offset K0 of the configured resources 310 by one, the UE 115 may generate one or more scheduling offsets K0 for the second subset of shared channels based on incrementing the scheduling offset associated with the first subset of shared channels by one.

As such, a derived resource 315, corresponding to the derived second set of parameters, may be scheduled for a PDSCH after each respective configured resource 310 based on incrementing the scheduling offset by one. For example, a derived resource 315-*a* may be scheduled one slot after the configured resource 310-*a*, a derived resource 315-*b* may be scheduled one slot after the configured resource 310-*b*, and so on for a derived resource 315-*c*, a derived resource 315-*d*, and a derived resource 315-*e*. In addition, each corresponding configured resource 310 and derived resource 315 may share the same parameters (e.g., mapping type, start symbol, and quantity of consecutive symbols within a slot in which the shared channels are scheduled). By configuring the time domain resources in the radio frame 305-*a* in this way, the network entity 105 may double the quantity of shared channels scheduled in the same DCI (e.g., the network entity 105 may schedule eight configured resources 310 and eight corresponding derived resources 315 instead of eight configured resources 310).

In some examples, the network entity 105 may transmit the control message to the UE 115, the control message indicating one or more repetition values that indicate one or more numbers for incrementing the scheduling offset associated with the first subset of shared channels. The UE 115 may generate one or more respective scheduling offsets K0 for the second subset of shared channels in accordance with the one or more repetition values indicated by the control message. For example, the network entity 105 may configure one repetition value that the UE 115 may use for all combinations of parameters in a row of the TDRA table, two repetition values, one of which the UE 115 may use for a last combination of parameters in the row and one of which the UE 115 may use for the other preceding combinations of parameters in the row, or more than two repetition values, where the UE 115 may use one repetition value for each combination of parameters in the row. In some cases, the network entity 105 may further restrict the repetition values when more than four combinations of parameters are configured in the TDRA table.

For example, a radio frame 305-*b* may indicate a quantity of time domain resources (e.g., slots) corresponding to PDSCHs scheduled by the network entity 105. The first quantity of shared channels may correspond to a configured resource 310-*f* and a configured resource 310-*g* in the radio frame 305-*b*. In some examples, the configured resource 310-*g* may have a smaller transport block size than the configured resource 310-*f* (e.g., may carry less data). The configured resources 310 may correspond to the first set of parameters, where one or more combinations of the parameters in the first set of parameters may be indicated in a given row of the TDRA table. For example, the second message (e.g., including DCI) may indicate an index corresponding to a row of the TDRA table that includes the one or more combinations of the parameters. The row may indicate combinations of parameters corresponding to each configured resource 310 such that the network entity 105 may schedule PDSCHs associated with each configured resource 310. For example, a first entry in the row may correspond to the configured resource 310-*f*, a second entry in the row may correspond to the configured resource 310-*g*. Each entry may indicate a respective SLIV for each configured resource 310. In addition, each configured resource 310 may have a same scheduling offset, K0 (e.g., K0 for PDSCHs, K2 for PUSCHs).

The UE 115 may use the first set of parameters included in the row of the TDRA table for each configured resource 310 to determine a respective derived resource 315. Accordingly, the UE 115 may generate the second set of parameters for the second subset of shared channels (e.g., the additional shared channels) by reusing (e.g., duplicating) the first set of parameters and incrementing the scheduling offset by one, eight times for the configured resource 310-*f*. For example, if the control message from the network entity 105 indicates to increment the scheduling offset K0 of the configured resources 310 by one and indicates a repetition value of eight, the UE 115 may generate one or more scheduling offsets K0 for the second subset of shared channels based on incrementing the scheduling offset associated with the first subset of shared channels by one eight times. As such, eight derived resources 315, corresponding to the derived second set of parameters, may be scheduled for a PDSCH after the configured resource 310-*f* Each derived resource 315 may share the same parameters (e.g., mapping type, start symbol, and quantity of consecutive symbols within a slot in which the shared channels are scheduled) as the configured resource 310-*f* In some examples, using a repetition value of eight and generating eight derived resources 315 (e.g., which are a same size as the configured resource 310-*f*) may account for the configured resource 310-*g* being smaller than the configured resource 310-*f*. By configuring the time domain resources in the radio frame 305-*b* in this way, the network entity 105 may schedule more shared channels in the same DCI without adding rows to the TDRA table for the second set of parameters.

Alternatively, the UE 115 may determine the second set of parameters based on the first set of parameters and one or more row offsets associated with the first set of parameters. For example, the UE 115 may repeat a row of the TDRA table and create a derived resource 315 for each shared channel of the second subset of shared channels based on the parameters of a first combination in the row after a configured resource 310 for a last combination in the row with an offset between them, and so on. In some examples, the row offset may be configured by the network entity 105 (e.g., a default value of one slot).

A radio frame 305-*c* may indicate a quantity of time domain resources (e.g., slots) corresponding to PDSCHs scheduled by the network entity 105. For example, the first quantity of shared channels (e.g., 5 shared channels) may correspond to a same quantity of configured resources 310 in the radio frame 305-*c*. The configured resources 310 may correspond to the first set of parameters, where one or more combinations of the parameters in the first set of parameters may be indicated in a given row of the TDRA table. For example, the second message (e.g., including DCI) may indicate an index corresponding to a row of the TDRA table that includes the one or more combinations of the parameters. The row may indicate combinations of parameters corresponding to each configured resource 310 such that the network entity 105 may schedule PDSCHs associated with each configured resource 310. Each entry may indicate a respective SLIV for each configured resource 310. In addition, each configured resource 310 may have a same scheduling offset, K0 (e.g., K0 for PDSCHs, K2 for PUSCHs).

The UE 115 may use the first set of parameters included in the row of the TDRA table for each configured resource 310 to determine a respective derived resource 315. Accordingly, the UE 115 may generate the second set of parameters for the second subset of shared channels (e.g., the additional shared channels) by repeating the first set of parameters for each configured resource 310 with a scheduling offset of zero (e.g., without an offset), and with the indicated row offset. The respective derived resources 315 may be scheduled after all of the configured resources 310 in the radio frame 305-*c* such that the derived resources 315 effectively repeat the configured resources 310. In addition, each corresponding configured resource 310 and derived resource 315 may share the same parameters (e.g., mapping type, start symbol, and quantity of consecutive symbols within a slot in which the shared channels are scheduled). By configuring the time domain resources in the radio frame 305-*a* in this way, the network entity 105 may double the quantity of shared channels scheduled in the same DCI (e.g., the network entity 105 may schedule eight configured resources 310 and eight corresponding derived resources 315 instead of eight configured resources 310).

Alternatively, the UE 115 may generate the second set of parameters based on different indications (e.g., from the network entity 105). For example, the UE 115 may receive a control message (e.g., an RRC configuration message) from the network entity 105 indicating TDRA information associated with the second subset of shared channels, and the UE 115 may generate the second set of parameters based on the control message, where one or more parameters of the second set is the same as one or more parameters of the first set. Alternatively, the UE 115 may receive a DCI message (e.g., the second message) including at least one bit indicating the second set of parameters. In some cases, the network entity 105 may configure the generation of the second set of parameters (e.g., via the control message or the DCI) per row of the TDRA table or for the entire TDRA table.

Figure 4:
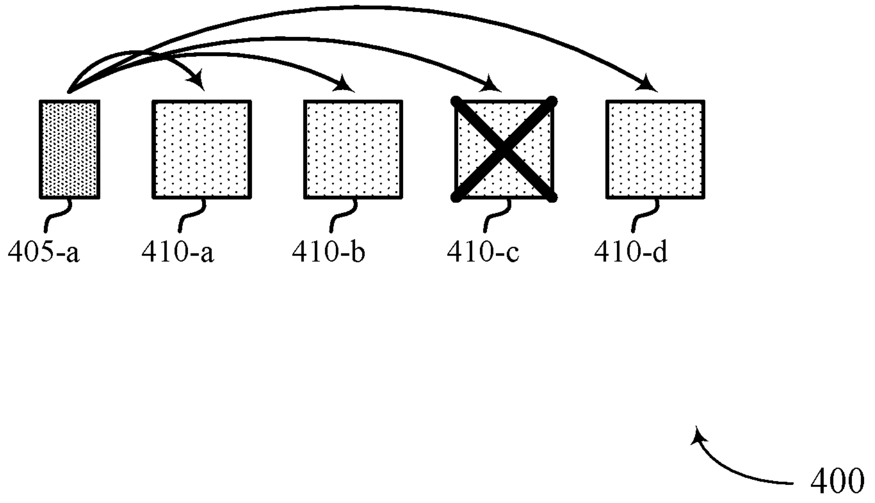
FIG. 4 illustrates an example of a transmission scheme that supports multi-shared channel scheduling for XR in accordance with one or more aspects of the present disclosure.
Figure 4:
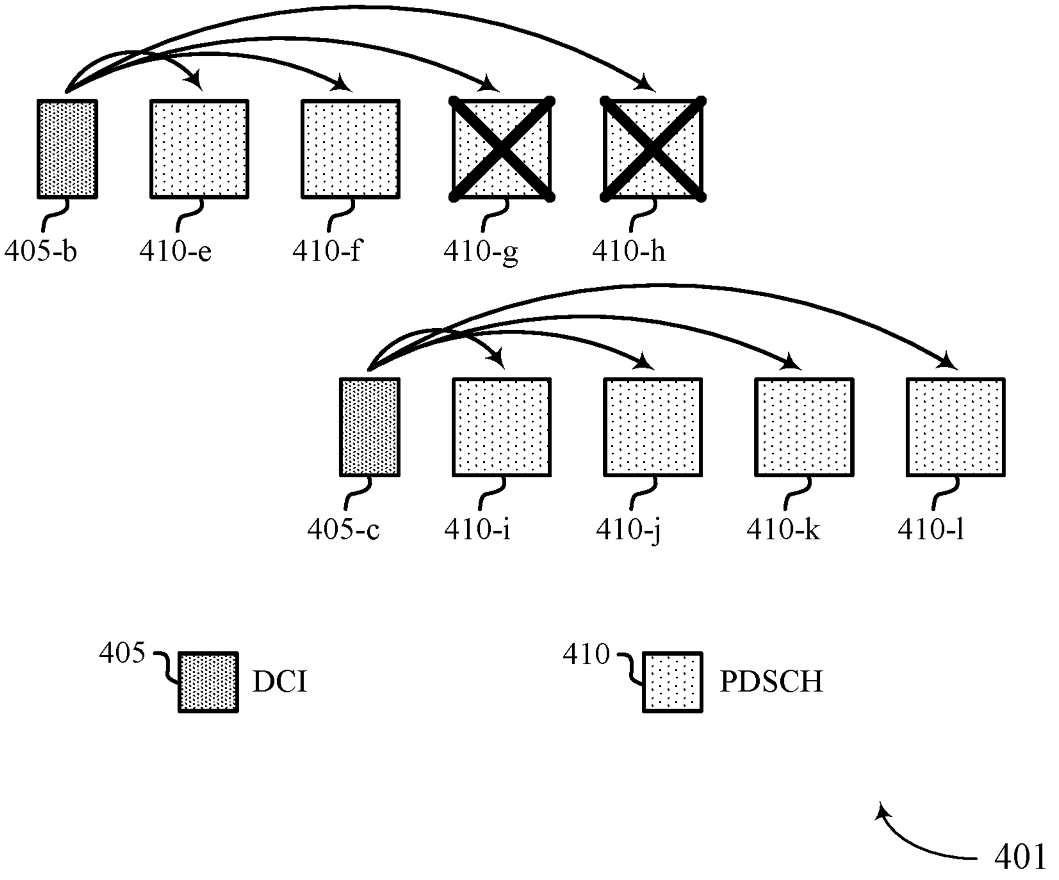

FIG. 4 illustrates an example of a transmission scheme 400 and a transmission scheme 401 that supports multi-shared channel scheduling for XR in accordance with one or more aspects of the present disclosure. In some examples, the transmission scheme 400 and the transmission scheme 401 may implement aspects of the wireless communications systems 100 and 200 or may be implemented by aspects of the wireless communications systems 100 and 200. For example, a UE 115 and a network entity 105 may drop or cancel one or more shared channels (e.g., PDSCHs 410, PUSCHs, or both) scheduled by a same DCI 405 in accordance with the transmission scheme 400 or the transmission scheme 401.

To support multi-shared channel scheduling for XR video frame data, a network entity 105 may transmit a first message (e.g., a control message) to a UE 115 that indicates a first set of parameters associated with TDRA information for a first quantity of shared channels (e.g., corresponding to a maximum quantity of shared channels). In some cases, the TDRA information may be indicated in a TDRA table, where each row of the TDRA table may include one or more combinations of parameters for the first quantity of shared channels. The parameters may include a mapping type, a start symbol, a quantity of consecutive symbols within a slot in which the shared channels are scheduled, or any combination thereof.

In some examples, using the transmission scheme 400, the network entity 105 may transmit DCI 405 (e.g., a second message) to the UE 115 that schedules a set of set of shared channels, where a quantity of shared channels in the set of shared channels exceeds the first quantity of shared channels. That is, the set of shared channels may include a first subset of shared channels (e.g., the first quantity of shared channels) and a second subset of shared channels (e.g., one or more additional shared channels), such that the set of shared channels includes more shared channels than were included in the first quantity. In addition, the additional shared channels included in the second subset may be initially excluded from the TDRA table indicated in the message. Accordingly, the DCI 405 may schedule the first quantity of shared channels and the one or more additional shared channels.

In some examples, XR video frame data may be associated with a limited delay budget and a large data size. As such, even if the network entity 105 successfully transmits at least a portion of the XR video frame data within a deadline associated with the delay budget, the UE 115 may discard the received video frame data because the network entity failed to deliver the entire video frame within the deadline. Accordingly, the network entity 105 may trigger a cancellation of the video frame transmission such that the UE 115 may discard (e.g., drop) video frame data already received, and cancel (e.g., not monitor for) any remaining video frame data that the network entity 105 has yet to transmit.

In some cases, the network entity 105 may configure the UE 115 to associate the shared channels (e.g., PDSCHs 410, PUCCHs, or both) scheduled by the same DCI 405 as data from a same video frame. For example, the UE 115 may receive a message from the network entity 105 indicating an association between the set of shared channels and a same data unit (e.g., application data unit) received at some application software of the UE 115. The data unit (e.g., a video frame) may correspond to a minimum amount of data consumed by the application software. In some examples, the message indicating the association may be an RRC configuration message, which may configure all DCIs 405 scheduling the set of shared channels. Alternatively, the association may be indicated in DCI 405 that schedules the set of shared channels. In some examples, the association may be based on a search space set associated with scheduling the set of shared channels, a CORESET associated with scheduling the set of shared channels, or both. As such, the network entity 105 may schedule video frame data transmissions in multiple DCIs 405, however a particular same DCI 405 may schedule the set of shared channels for transmitting data from a same video frame.

In some examples, for XR data transmissions, the UE 115 may cancel all shared channels scheduled by the same DCI 405 if the network entity 105 cancels any one or more shared channels. The UE 115 may receive DCI 405-*a* from the network entity 105 scheduling a set of shared channels, which may include a first subset of shared channels (e.g., an initial quantity of shared channels), a second subset of shared channels (e.g., one or more additional channels), and a third subset of shared channels (e.g., one or more additional channels). For example, the DCI 405-*a* may schedule a PDSCH 410-*a*, a PDSCH 410-*b*, a PDSCH 410-*c*, and a PDSCH 410-*d*, which each may be included in the third subset, in addition to a quantity of PDSCHs 410 in the first subset and the second subset.

The UE 115 may communicate the first and second subsets of shared channels using respective sets of parameters, as described herein with reference to FIG. 2. In addition, the UE 115 may receive a third message from the network entity 105 indicating cancellation of communications of at least one shared channel of the third subset of shared channels. For example, the third message may indicate cancellation of communications of the PDSCH 410-*c*. Based on the third message and the association between the scheduled set of shared channels and the same data unit received at the UE 115, the UE 115 may drop the PDSCH 410-*c* and any other PDSCHs 410 in the third subset and indicated in the third message. That is, the network entity 105 may refrain from transmitting any remaining video frame data at the point of the cancellation, and the UE 115 may cancel any scheduled control channels in the future.

In some examples, the network entity 105 may configure the cancellation in an RRC configuration message. Alternatively, the third message may include an additional DCI that may configure the cancellation. For example, the third message may indicate one bit in a bit field for the UE 115 which may indicate the cancellation configuration. In some examples, the third message may indicate the cancellation configuration and one or more canceled resources that may overlap with more than one shared channels, where the third message may be specific to the UE 115.

Alternatively, the UE 115 may cancel the third subset of shared channels based on receiving a second DCI 405 that schedules additional shared channels (e.g., PDSCHs 410) in accordance with the transmission scheme 401. The UE 115 may receive DCI 405-*b* from the network entity 105 scheduling a set of shared channels, which may include a first subset of shared channels (e.g., an initial quantity of shared channels), a second subset of shared channels (e.g., one or more additional channels), and a third subset of shared channels (e.g., one or more additional channels). For example, the DCI 405-*b* may schedule a PDSCH 410-*e*, a PDSCH 410-*f*, a PDSCH 410-*g*, and a PDSCH 410-*h*, which each may be included in the third subset, in addition to a quantity of PDSCHs 410 in the first subset and the second subset.

The UE 115 may communicate the first and second subsets of shared channels using respective sets of parameters, as described herein with reference to FIG. 2. In addition, the UE 115 may receive DCI 405-*c* from the network entity 105 scheduling a set of shared channels, which may include a first subset of shared channels (e.g., an initial quantity of shared channels), a second subset of shared channels (e.g., one or more additional channels), and a third subset of shared channels (e.g., one or more additional channels). For example, the DCI 405-*c* may schedule a PDSCH 410-*i*, a PDSCH 410-*j*, a PDSCH 410-*k*, and a PDSCH 410-1, which each may be included in the third subset, in addition to a quantity of PDSCHs 410 in the first subset and the second subset.

In some examples, the DCI 405-*c* may schedule the PDSCHs 410 in a duration that at least partially overlaps with a scheduled duration of the PDSCHs 410 scheduled via the DCI 405-*b*. For example, the DCI 405-*c* may schedule the PDSCH 410-*i* and the PDSCH 410-*j* such that the PDSCH 410-*i* and the PDSCH 410-*j* overlap (e.g., in time) with a time duration from the start of the PDSCH 410-*g* to the end of a duration of the PDSCH 410-*h* scheduled via the DCI 405-*b*, respectively. Based on the overlap and the third message indicating the association between the set of shared channels and the same data unit received at the UE 115, the UE 115 may drop the PDSCH 410-*g* and the PDSCH 410-*h*. Additionally, the UE 115 may drop all of the PDSCHs 410 scheduled via the DCI 405.

Figure 5:
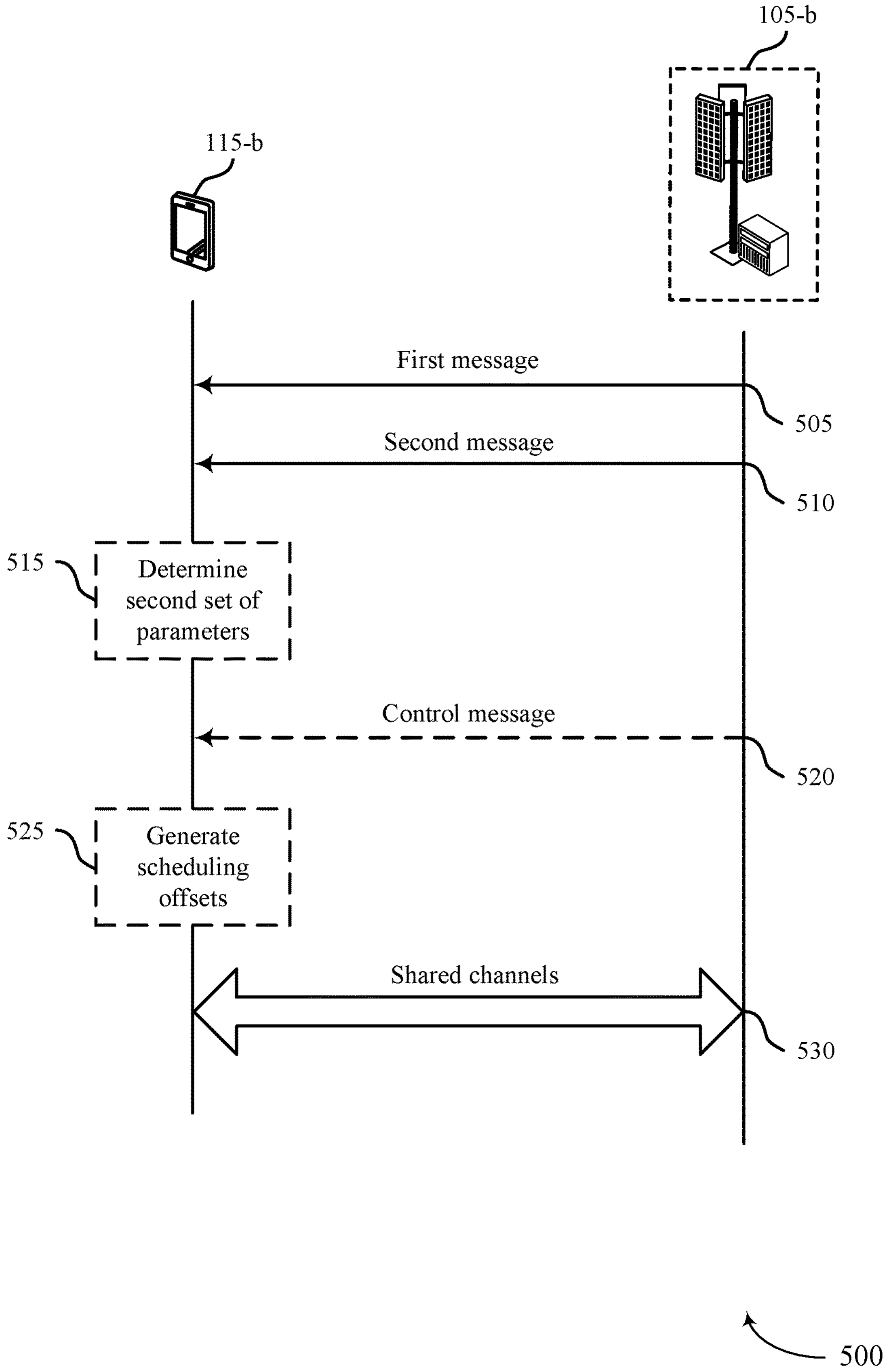
FIG. 5 illustrates an example of a process flow that supports multi-shared channel scheduling for XR in accordance with one or more aspects of the present disclosure.

FIG. 5 illustrates an example of a process flow 500 that supports multi-shared channel scheduling for XR in accordance with one or more aspects of the present disclosure. The process flow 500 may implement aspects of wireless communications systems 100 and 200, or may be implemented by aspects of the wireless communications systems 100 and 200. For example, the process flow 500 may illustrate operations between a UE 115-*b* and a network entity 105-*b*, which may be examples of corresponding devices described herein. In the following description of the process flow 500, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 500, and other operations may be added to the process flow 500.

At 505, the UE 115-*b* may receive, from the network entity 105-*b*, a first message indicating a first set of parameters associated with TDRA information for a first quantity of shared channels. The first quantity of shared channels may include one or more PDSCHs, PUSCHs, or both. In addition, the parameters may include a mapping type, a start symbol, a quantity of consecutive symbols within a slot in which the shared channels are scheduled, or any combination thereof, and the first quantity of shared channels may be associated with a scheduling offset. In some examples, the first set of parameters may be indicated in a TDRA table in the first message.

At 510, the UE 115-*b* may receive, from the network entity 105-*b*, a second message scheduling a set of shared channels (e.g., PDSCHs, PUSCHs, or both) where a second quantity of the set of shared channels exceeds the first quantity of shared channels. The second message may include DCI that schedules the set of shared channels. For example, the set of shared channels may include a first subset of shared channels, which includes the first quantity of shared channels, and a second subset of shared channels, which includes one or more additional shared channels. As such, the additional shared channels may increase the second quantity of shared channels such that the second quantity exceeds the first quantity. In addition, parameters for the second subset of shared channels may be initially excluded from the TDRA table.

At 515, the UE 115-*b* may determine a second set of parameters for the second subset of shared channels based on the first set of parameters. For example, the UE 115-*b* may use the same parameters for the second set as for the first set. The UE 115-*b* may derive the second set of parameters in such a way to refrain from adding rows to the TDRA table and increasing overhead.

At 520, the UE 115-*b* may receive, from the network entity 105-*b*, a control message indicating a number for incrementing a scheduling offset associated with the first subset of shared channels. For example, the control message may indicate for the UE 115-*b* to increment the scheduling offset (e.g., K0 for PDSCHs, K2 for PUSCHs) by one. In some examples, the control message may indicate a repetition value the UE 115-*b* may use in addition to the number.

At 525, the UE 115-*b* may generate one or more scheduling offsets (e.g., K0) for the second subset of shared channels based on incrementing the scheduling offset associated with the first subset of shared channels by the indicated number. In some examples, the UE 115-*b* may determine the second set of parameters based on generating the one or more scheduling offsets. For example, the UE 115-*b* may configure a time domain resource for each PDSCH in the second subset of shared channels with a scheduling offset incremented by one (e.g., the number indicated in the control message), where the second set of parameters corresponding to the time domain resources and PDSCHs may be the same as the first set of parameters.

At 530, the UE 115-*b* and the network entity 105-*b* may communicate the first subset of shared channels based on the first set of parameters and the second subset of shared channels based on the second set of parameters the UE 115-*b* determined based on the first set of parameters. As such, the network entity 105-*b* may use a same DCI (e.g., in the second message) to schedule multiple shared channels without increasing overhead and to increase scheduling efficiency.

Figure 6:
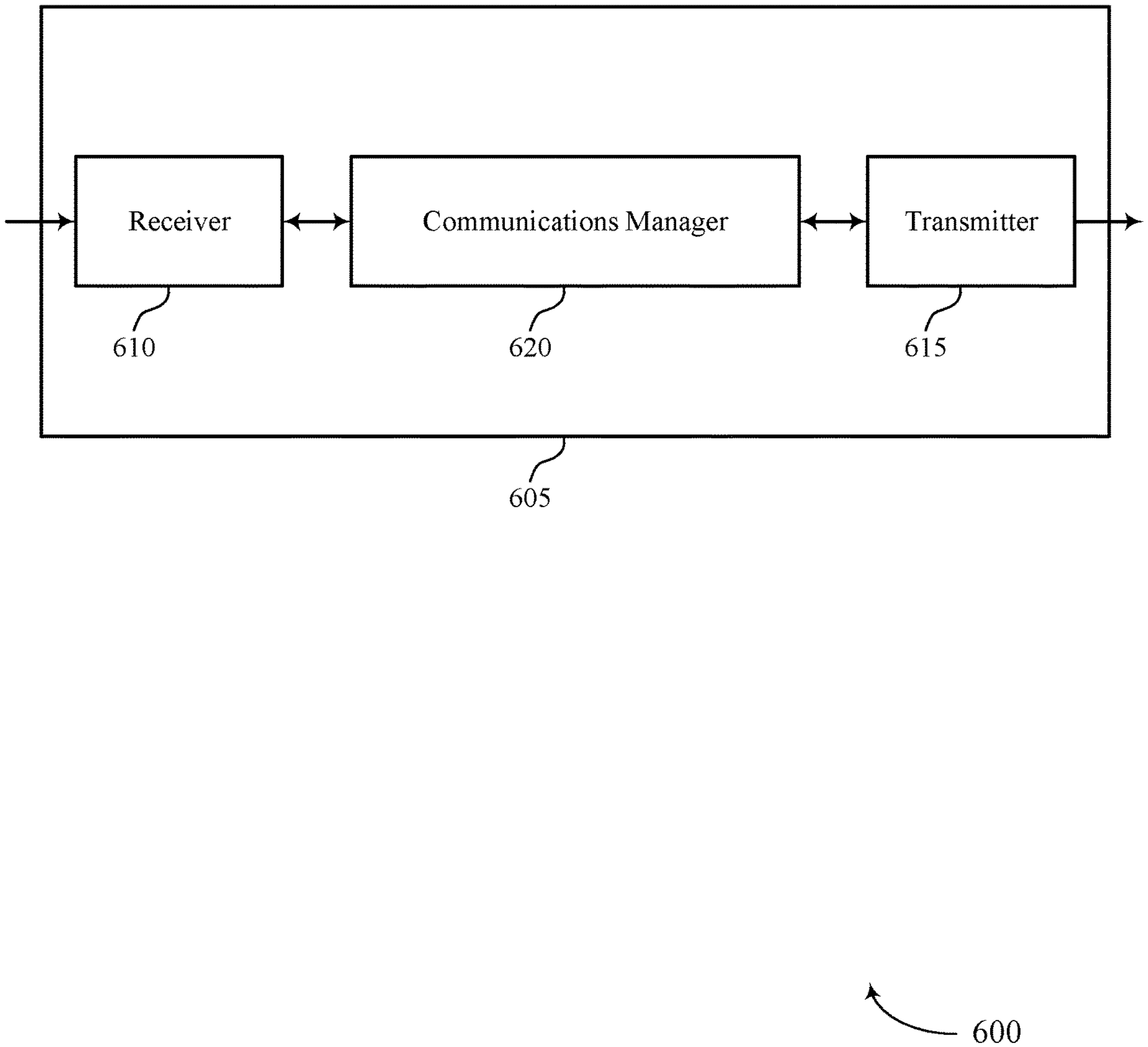
FIGS. 6 and 7 show block diagrams of devices that support multi-shared channel scheduling for XR in accordance with one or more aspects of the present disclosure.

FIG. 6 shows a block diagram 600 of a device 605 that supports multi-shared channel scheduling for XR in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-shared channel scheduling for XR). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-shared channel scheduling for XR). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of multi-shared channel scheduling for XR as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first message indicating a first set of multiple parameters associated with TDRA information for a first quantity of shared channels. The communications manager 620 may be configured as or otherwise support a means for receiving a second message scheduling a set of shared channels, where a second quantity of the set of shared channels exceeds the first quantity of shared channels. The communications manager 620 may be configured as or otherwise support a means for communicating a first subset of shared channels of the set of shared channels based on the first set of multiple parameters and a second subset of shared channels of the set of shared channels using a second set of multiple parameters determined based on the first set of multiple parameters.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for scheduling multiple shared channels in a same DCI, which may reduce system overhead and increase scheduling efficiency, among other benefits.

Figure 7:
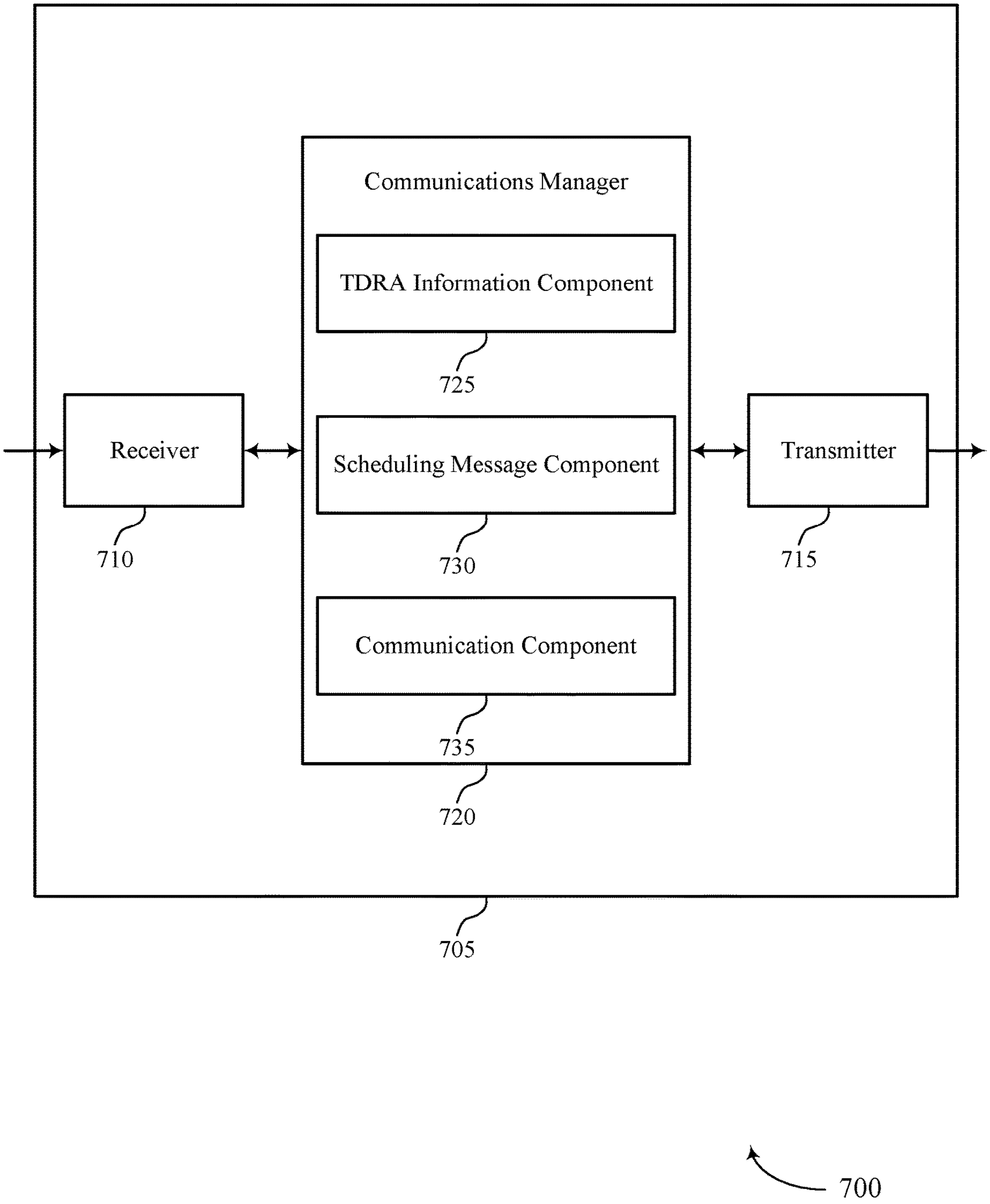

FIG. 7 shows a block diagram 700 of a device 705 that supports multi-shared channel scheduling for XR in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-shared channel scheduling for XR). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-shared channel scheduling for XR). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of multi-shared channel scheduling for XR as described herein. For example, the communications manager 720 may include a TDRA information component 725, a scheduling message component 730, a communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The TDRA information component 725 may be configured as or otherwise support a means for receiving a first message indicating a first set of multiple parameters associated with TDRA information for a first quantity of shared channels. The scheduling message component 730 may be configured as or otherwise support a means for receiving a second message scheduling a set of shared channels, where a second quantity of the set of shared channels exceeds the first quantity of shared channels. The communication component 735 may be configured as or otherwise support a means for communicating a first subset of shared channels of the set of shared channels based on the first set of multiple parameters and a second subset of shared channels of the set of shared channels using a second set of multiple parameters determined based on the first set of multiple parameters.

Figure 8:
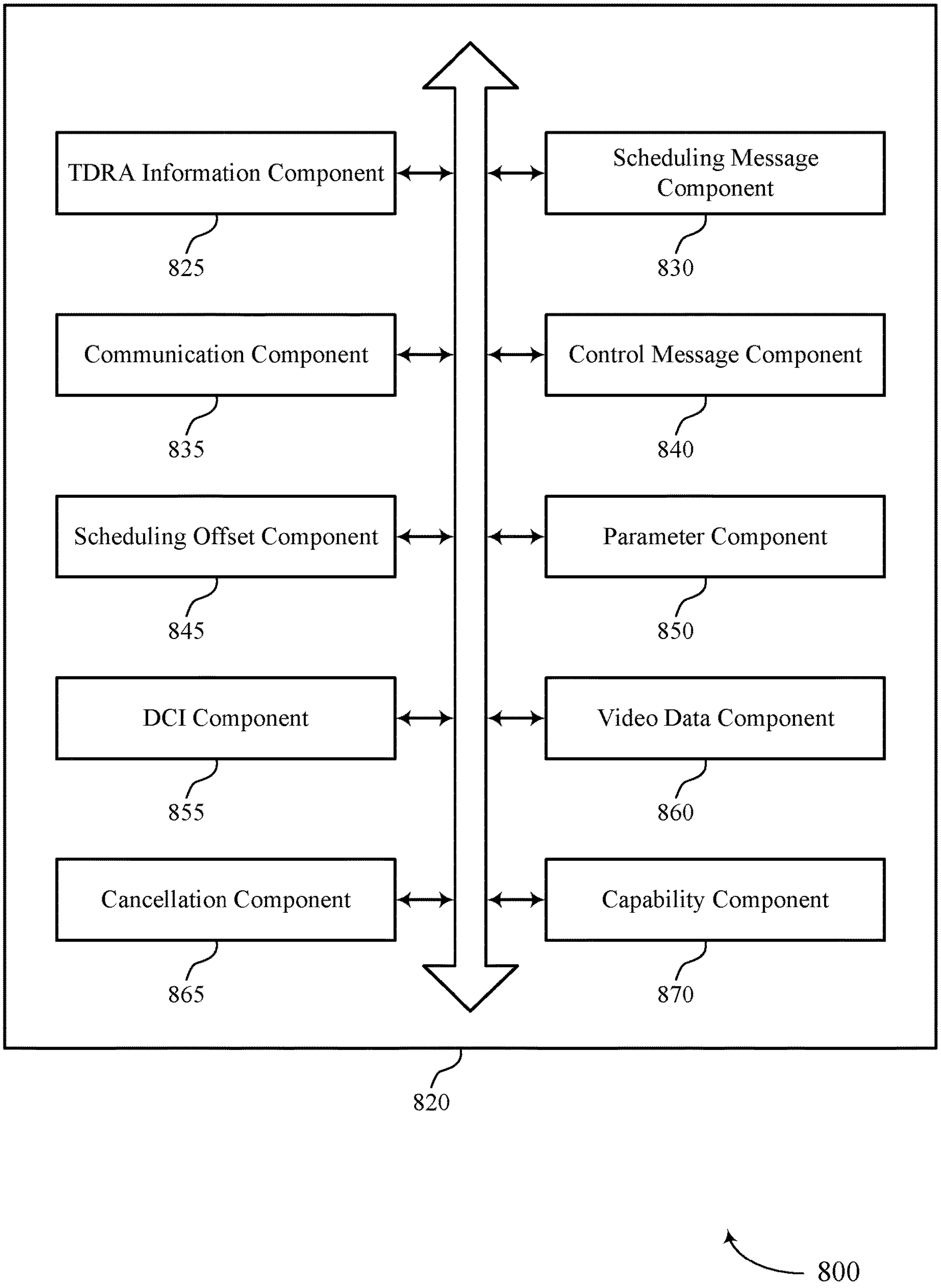
FIG. 8 shows a block diagram of a communications manager that supports multi-shared channel scheduling for XR in accordance with one or more aspects of the present disclosure.

FIG. 8 shows a block diagram 800 of a communications manager 820 that supports multi-shared channel scheduling for XR in accordance with one or more aspects of the present disclosure. The communications manager 820 may be an example of aspects of a communications manager 620, a communications manager 720, or both, as described herein. The communications manager 820, or various components thereof, may be an example of means for performing various aspects of multi-shared channel scheduling for XR as described herein. For example, the communications manager 820 may include a TDRA information component 825, a scheduling message component 830, a communication component 835, a control message component 840, a scheduling offset component 845, a parameter component 850, a DCI component 855, a video data component 860, a cancellation component 865, a capability component 870, or any combination thereof. Each of these components may communicate, directly or indirectly, with one another (e.g., via one or more buses).

The communications manager 820 may support wireless communication at a UE in accordance with examples as disclosed herein. The TDRA information component 825 may be configured as or otherwise support a means for receiving a first message indicating a first set of multiple parameters associated with TDRA information for a first quantity of shared channels. The scheduling message component 830 may be configured as or otherwise support a means for receiving a second message scheduling a set of shared channels, where a second quantity of the set of shared channels exceeds the first quantity of shared channels. The communication component 835 may be configured as or otherwise support a means for communicating a first subset of shared channels of the set of shared channels based on the first set of multiple parameters and a second subset of shared channels of the set of shared channels using a second set of multiple parameters determined based on the first set of multiple parameters.

In some examples, the control message component 840 may be configured as or otherwise support a means for receiving a control message indicating a number for incrementing a scheduling offset associated with the first subset of shared channels. In some examples, the scheduling offset component 845 may be configured as or otherwise support a means for generating one or more scheduling offsets for the second subset of shared channels based on incrementing the scheduling offset associated with the first subset of shared channels by the indicated number.

In some examples, the scheduling offset component 845 may be configured as or otherwise support a means for generating one or more respective scheduling offsets in accordance with one or more repetition values indicated by the control message, the one or more repetition values indicating one or more numbers for incrementing the scheduling offset associated with the first subset of shared channels.

In some examples, the parameter component 850 may be configured as or otherwise support a means for generating the second set of multiple parameters based on the first set of multiple parameters and one or more row offsets associated with the first set of multiple parameters.

In some examples, the control message component 840 may be configured as or otherwise support a means for receiving a control message indicating TDRA information associated with the second subset of shared channels. In some examples, the parameter component 850 may be configured as or otherwise support a means for generating the second set of multiple parameters based on the control message, where one or more parameters of the second set of multiple parameters is the same as one or more parameters of the first set of multiple parameters.

In some examples, the DCI component 855 may be configured as or otherwise support a means for receiving a DCI message including at least one bit indicating the second set of multiple parameters.

In some examples, the parameter component 850 may be configured as or otherwise support a means for determining the first set of multiple parameters and the second set of multiple parameters, where the first set of multiple parameters and the second set of multiple parameters each includes a mapping type, a start symbol, a quantity of consecutive symbols, or any combination thereof.

In some examples, the parameter component 850 may be configured as or otherwise support a means for determining the second set of multiple parameters based on a lookup table, where the lookup table indicates one of the first set of multiple parameters or parameters that are based on the second quantity of the set of shared channels exceeding the first quantity of shared channels.

In some examples, the video data component 860 may be configured as or otherwise support a means for receiving a third message indicating an association between the set of shared channels and a same data unit received at the UE. In some examples, the association is based on a search space set associated with scheduling of the set of shared channels, a control resource set associated with scheduling of the set of shared channels, or both.

In some examples, the cancellation component 865 may be configured as or otherwise support a means for receiving the third message indicating cancellation of communications of at least one shared channel of a third subset of shared channels of the set of shared channels. In some examples, the cancellation component 865 may be configured as or otherwise support a means for dropping the third subset of shared channels of the set of shared channels based on the third message and the association between the set of shared channels and the same data unit received at the UE. In some examples, the third message is specific to the UE.

In some examples, the cancellation component 865 may be configured as or otherwise support a means for receiving the third message scheduling a second set of shared channels. In some examples, the cancellation component 865 may be configured as or otherwise support a means for dropping a third subset of shared channels of the set of shared channels based on receiving the third message.

In some examples, to support receiving the third message, the cancellation component 865 may be configured as or otherwise support a means for receiving the third message scheduling the second set of shared channels in a duration that at least partially overlaps with a scheduled duration of the third subset of shared channels. In some examples, the first subset and the second subset are communicated in accordance with a set of multiple SCS configurations.

In some examples, the capability component 870 may be configured as or otherwise support a means for transmitting a capability message indicating a capability of the UE to receive the first set of multiple parameters for a set of multiple SCS configurations. In some examples, the set of shared channels includes more than eight shared channels.

In some examples, to support receiving the second message, the scheduling message component 830 may be configured as or otherwise support a means for receiving the second message indicating an NDI, an RV field, or both, where the NDI and the RV field each include a quantity of bits based on the second quantity of shared channels.

In some examples, the control message component 840 may be configured as or otherwise support a means for receiving a control message indicating that an RV of an RV field is to be used for a retransmission of the set of shared channels by the UE, where the second message excludes the RV field.

Figure 9:
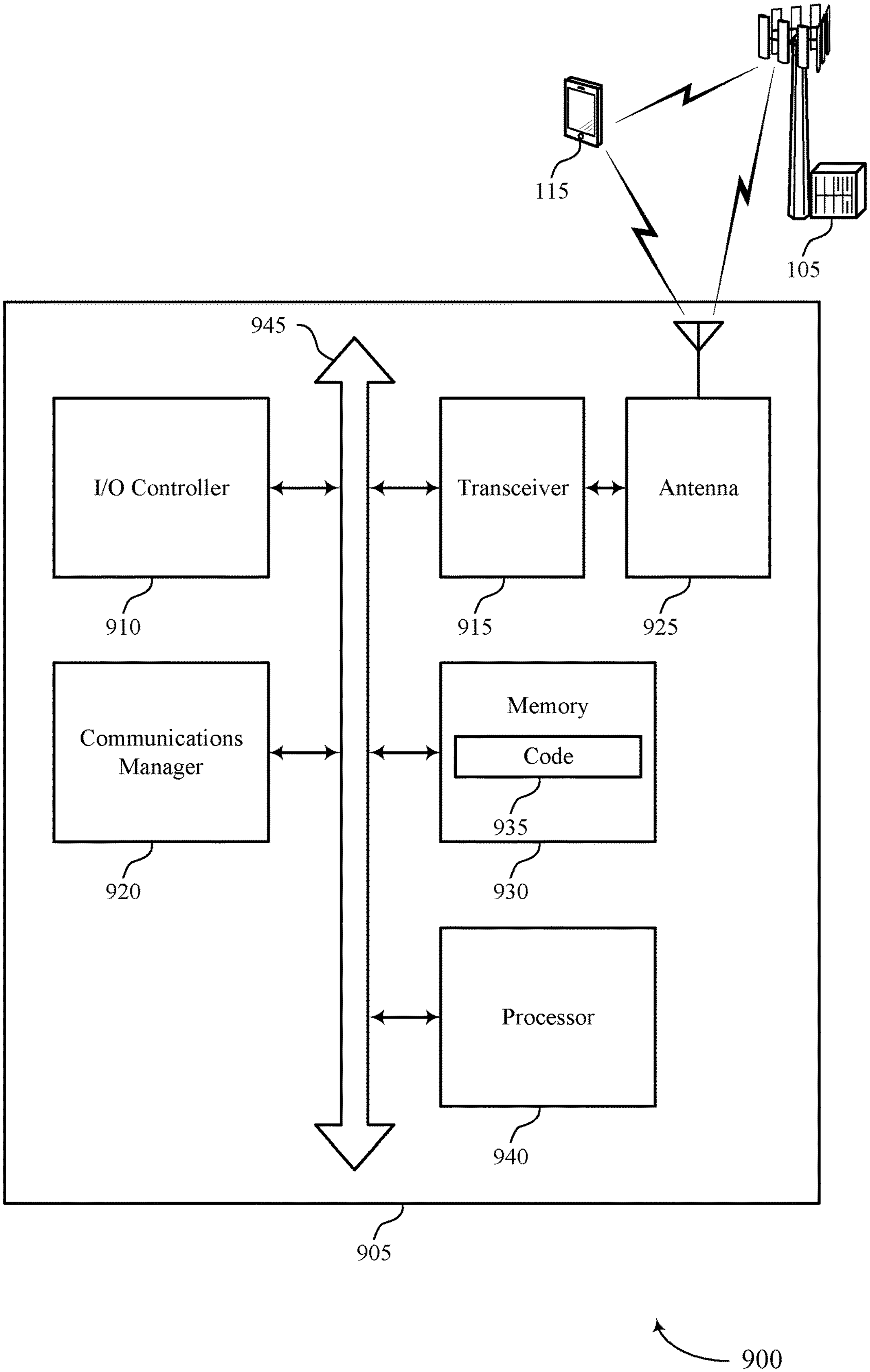
FIG. 9 shows a diagram of a system including a device that supports multi-shared channel scheduling for XR in accordance with one or more aspects of the present disclosure.

FIG. 9 shows a diagram of a system 900 including a device 905 that supports multi-shared channel scheduling for XR in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-shared channel scheduling for XR). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first message indicating a first set of multiple parameters associated with TDRA information for a first quantity of shared channels. The communications manager 920 may be configured as or otherwise support a means for receiving a second message scheduling a set of shared channels, where a second quantity of the set of shared channels exceeds the first quantity of shared channels. The communications manager 920 may be configured as or otherwise support a means for communicating a first subset of shared channels of the set of shared channels based on the first set of multiple parameters and a second subset of shared channels of the set of shared channels using a second set of multiple parameters determined based on the first set of multiple parameters.

By including or configuring the communications manager 920 in accordance with examples as described herein, the device 905 may support techniques for scheduling multiple shared channels in a same DCI, which may reduce system overhead and increase scheduling efficiency, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of multi-shared channel scheduling for XR as described herein, or the processor 940 and the memory 930 may be otherwise configured to perform or support such operations.

Figure 10:
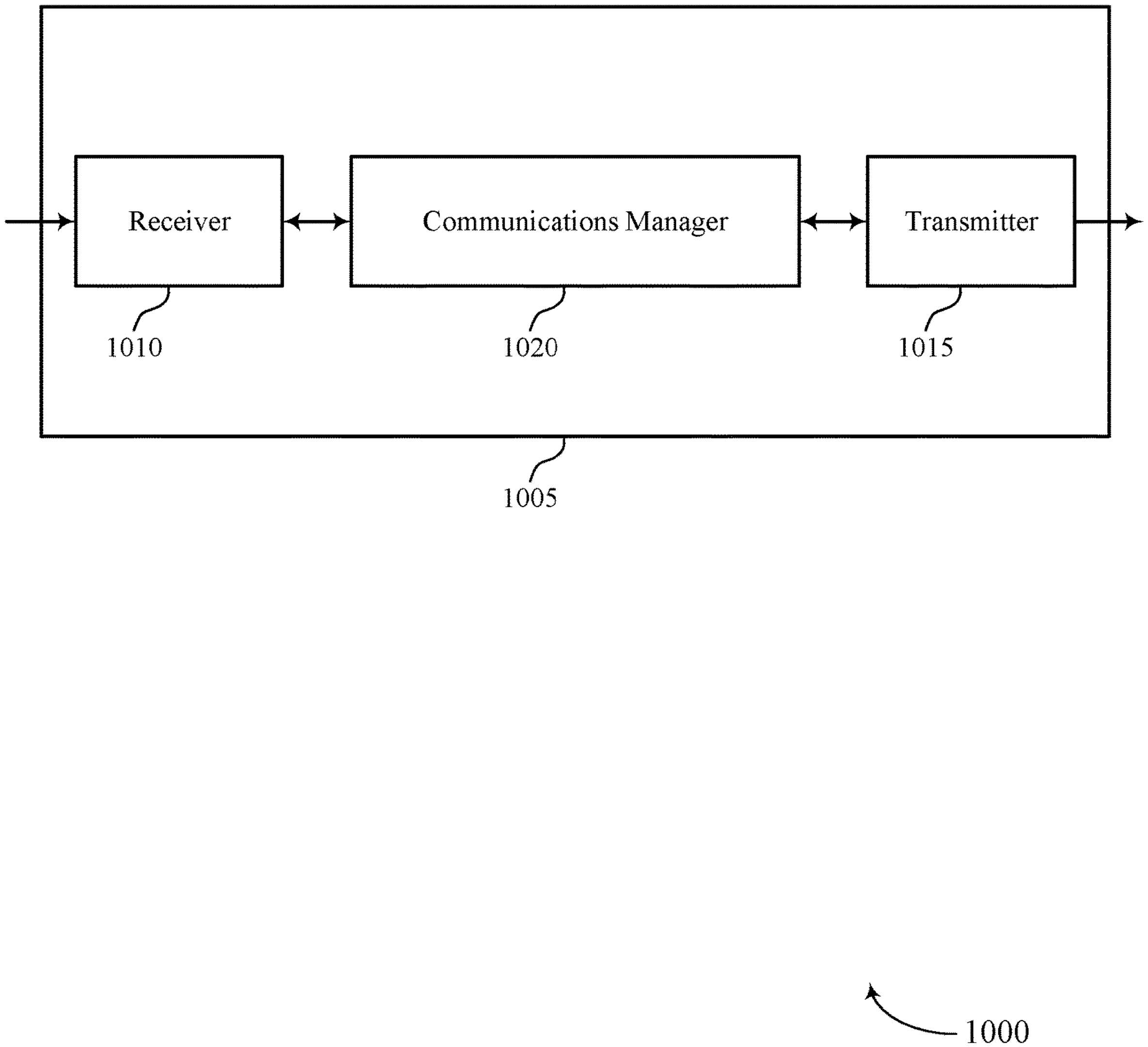
FIGS. 10 and 11 show block diagrams of devices that support multi-shared channel scheduling for XR in accordance with one or more aspects of the present disclosure.

FIG. 10 shows a block diagram 1000 of a device 1005 that supports multi-shared channel scheduling for XR in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of multi-shared channel scheduling for XR as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a first message indicating a first set of multiple parameters associated with TDRA information for a first quantity of shared channels. The communications manager 1020 may be configured as or otherwise support a means for transmitting a second message scheduling a set of shared channels, where a second quantity of the set of shared channels exceeds the first quantity of shared channels. The communications manager 1020 may be configured as or otherwise support a means for communicating a first subset of the set of shared channels based on the first set of multiple parameters and a second subset of shared channels of the set of shared channels using a second set of multiple parameters determined based on the first set of multiple parameters.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for scheduling multiple shared channels in a same DCI, which may reduce system overhead and increase scheduling efficiency, among other benefits.

Figure 11:
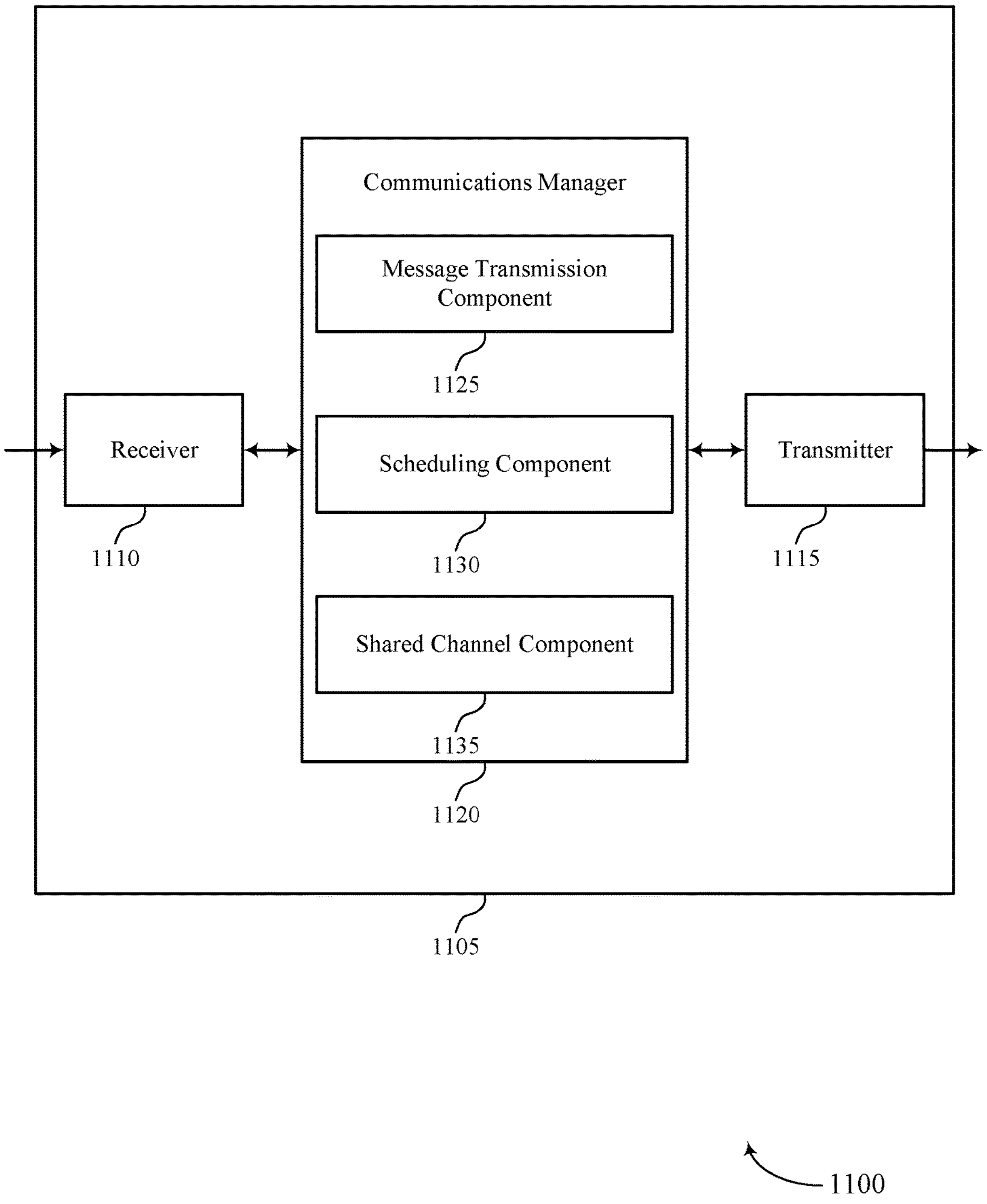

FIG. 11 shows a block diagram 1100 of a device 1105 that supports multi-shared channel scheduling for XR in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of multi-shared channel scheduling for XR as described herein. For example, the communications manager 1120 may include a message transmission component 1125, a scheduling component 1130, a shared channel component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The message transmission component 1125 may be configured as or otherwise support a means for transmitting a first message indicating a first set of multiple parameters associated with TDRA information for a first quantity of shared channels. The scheduling component 1130 may be configured as or otherwise support a means for transmitting a second message scheduling a set of shared channels, where a second quantity of the set of shared channels exceeds the first quantity of shared channels. The shared channel component 1135 may be configured as or otherwise support a means for communicating a first subset of the set of shared channels based on the first set of multiple parameters and a second subset of shared channels of the set of shared channels using a second set of multiple parameters determined based on the first set of multiple parameters.

Figure 12:
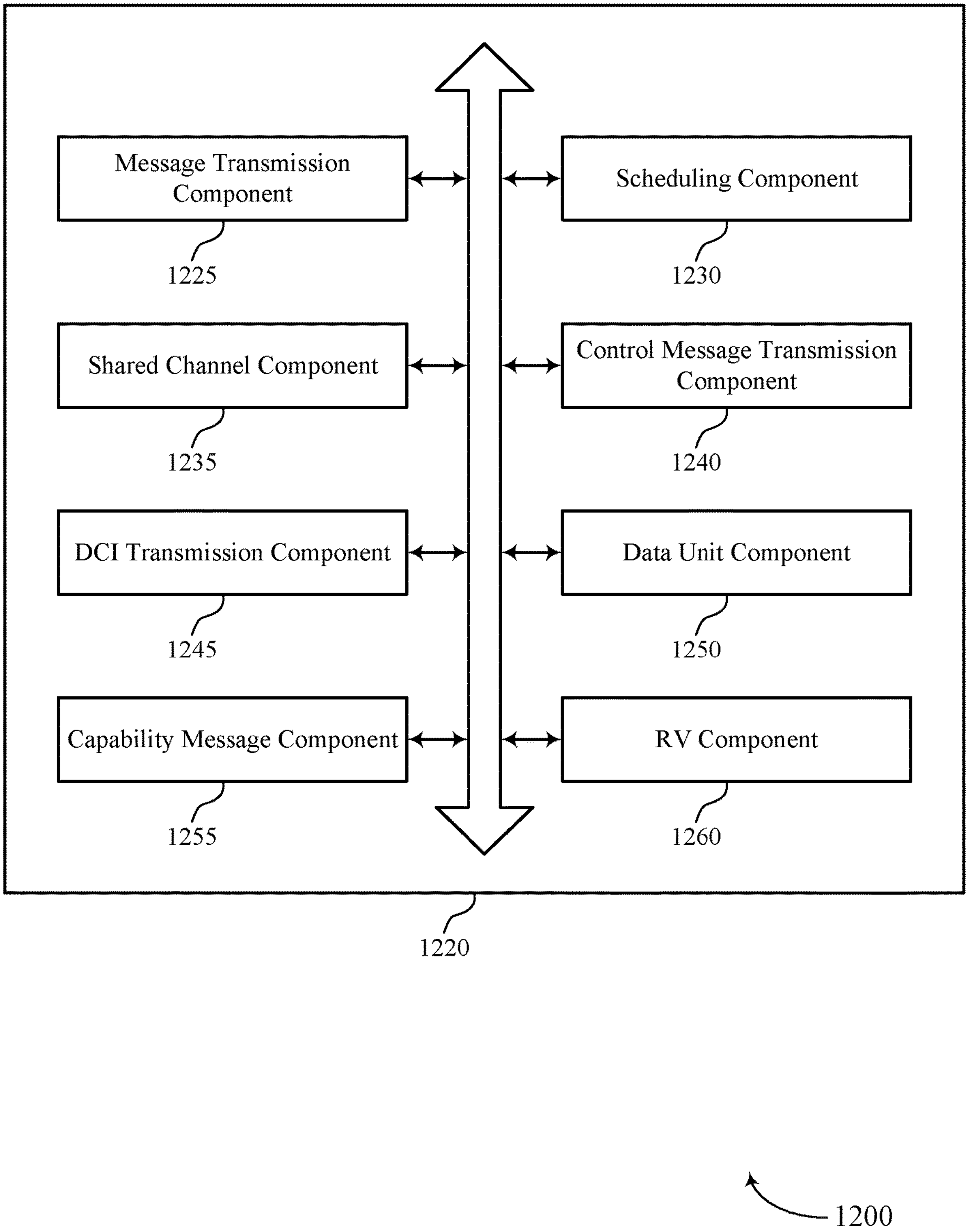
FIG. 12 shows a block diagram of a communications manager that supports multi-shared channel scheduling for XR in accordance with one or more aspects of the present disclosure.

FIG. 12 shows a block diagram 1200 of a communications manager 1220 that supports multi-shared channel scheduling for XR in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of multi-shared channel scheduling for XR as described herein. For example, the communications manager 1220 may include a message transmission component 1225, a scheduling component 1230, a shared channel component 1235, a control message transmission component 1240, a DCI transmission component 1245, a data unit component 1250, a capability message component 1255, an RV component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The message transmission component 1225 may be configured as or otherwise support a means for transmitting a first message indicating a first set of multiple parameters associated with TDRA information for a first quantity of shared channels. The scheduling component 1230 may be configured as or otherwise support a means for transmitting a second message scheduling a set of shared channels, where a second quantity of the set of shared channels exceeds the first quantity of shared channels. The shared channel component 1235 may be configured as or otherwise support a means for communicating a first subset of the set of shared channels based on the first set of multiple parameters and a second subset of shared channels of the set of shared channels using a second set of multiple parameters determined based on the first set of multiple parameters.

In some examples, the control message transmission component 1240 may be configured as or otherwise support a means for transmitting a control message indicating a number for incrementing a scheduling offset associated with the first subset of shared channels.

In some examples, the control message transmission component 1240 may be configured as or otherwise support a means for transmitting a control message indicating TDRA information associated with the second subset of shared channels.

In some examples, the DCI transmission component 1245 may be configured as or otherwise support a means for transmitting a DCI message including at least one bit indicating the second set of multiple parameters. In some examples, the first set of multiple parameters and the second set of multiple parameters each includes a mapping type, a start symbol, a quantity of consecutive symbols, or any combination thereof.

In some examples, the data unit component 1250 may be configured as or otherwise support a means for transmitting a third message indicating an association between the set of shared channels and a same data unit received at a UE. In some examples, the association is based on a search space set associated with scheduling of the set of shared channels, a control resource set associated with scheduling of the set of shared channels, or both.

In some examples, the data unit component 1250 may be configured as or otherwise support a means for transmitting the third message indicating cancellation of communications of at least one shared channel of a third subset of shared channels of the set of shared channels. In some examples, the third message is specific to the UE.

In some examples, the data unit component 1250 may be configured as or otherwise support a means for transmitting the third message scheduling a second set of shared channels.

In some examples, to support transmitting the third message, the data unit component 1250 may be configured as or otherwise support a means for transmitting the third message scheduling the second set of shared channels in a duration that at least partially overlaps with a scheduled duration of a third subset of shared channels. In some examples, the first subset and the second subset are communicated in accordance with a set of multiple SCS configurations.

In some examples, the capability message component 1255 may be configured as or otherwise support a means for receiving a capability message indicating a capability of a UE to receive the first set of multiple parameters for a set of multiple SCS configurations. In some examples, the set of shared channels includes more than eight shared channels.

In some examples, to support transmitting the second message, the scheduling component 1230 may be configured as or otherwise support a means for transmitting the second message indicating an NDI, an RV field, or both, where the NDI and the RV field each include a quantity of bits based on the second quantity of shared channels.

In some examples, the RV component 1260 may be configured as or otherwise support a means for excluding an RV of an RV field from the second message based on the second quantity of shared channels exceeding the first quantity of shared channels. In some examples, the RV component 1260 may be configured as or otherwise support a means for transmitting a control message indicating that the RV is to be used for a retransmission of the set of shared channels by a UE.

Figure 13:
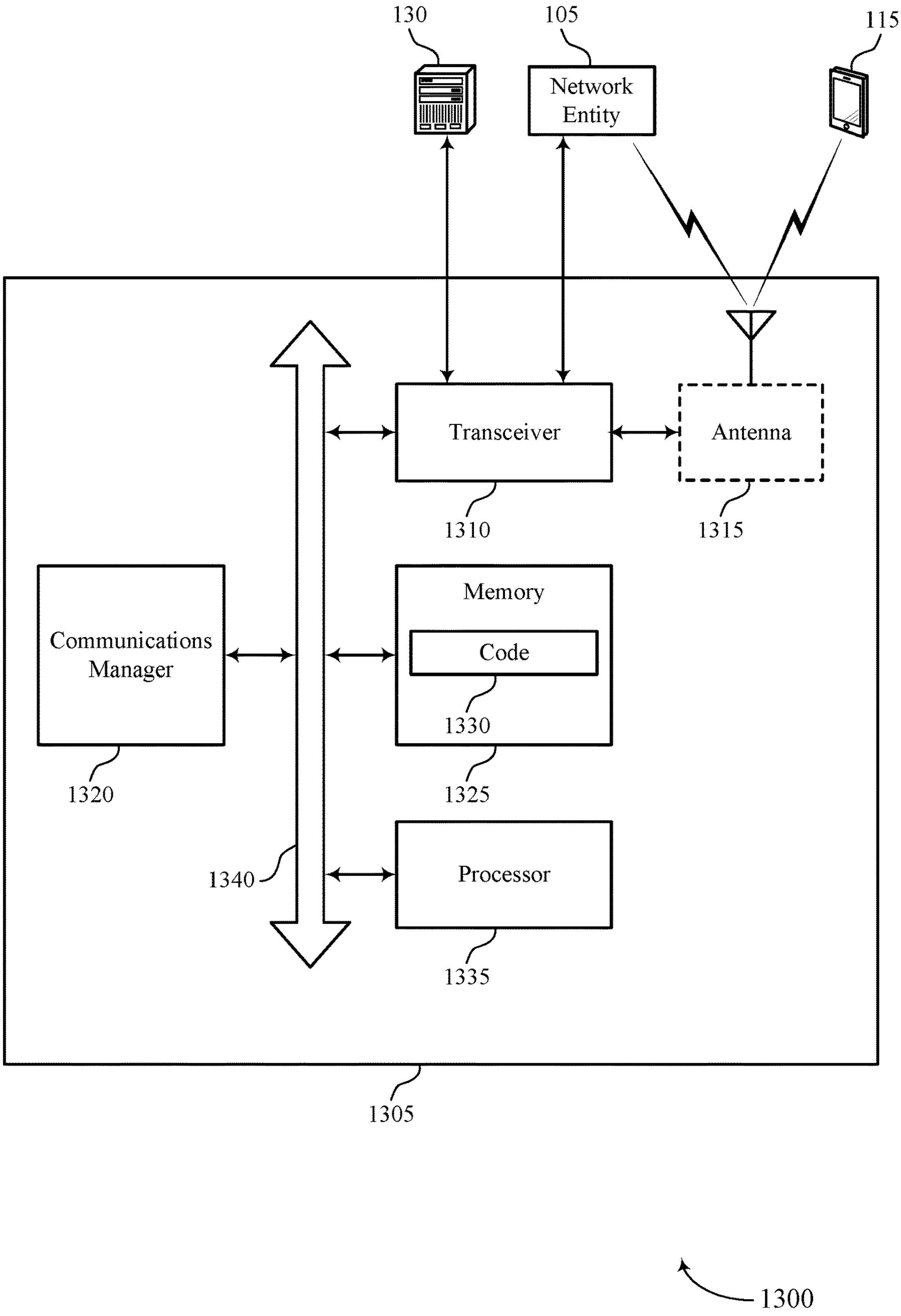
FIG. 13 shows a diagram of a system including a device that supports multi-shared channel scheduling for XR in accordance with one or more aspects of the present disclosure.

FIG. 13 shows a diagram of a system 1300 including a device 1305 that supports multi-shared channel scheduling for XR in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting multi-shared channel scheduling for XR). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a first message indicating a first set of multiple parameters associated with TDRA information for a first quantity of shared channels. The communications manager 1320 may be configured as or otherwise support a means for transmitting a second message scheduling a set of shared channels, where a second quantity of the set of shared channels exceeds the first quantity of shared channels. The communications manager 1320 may be configured as or otherwise support a means for communicating a first subset of the set of shared channels based on the first set of multiple parameters and a second subset of shared channels of the set of shared channels using a second set of multiple parameters determined based on the first set of multiple parameters.

By including or configuring the communications manager 1320 in accordance with examples as described herein, the device 1305 may support techniques for scheduling multiple shared channels in a same DCI, which may reduce system overhead and increase scheduling efficiency, among other benefits.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of multi-shared channel scheduling for XR as described herein, or the processor 1335 and the memory 1325 may be otherwise configured to perform or support such operations.

Figure 14:
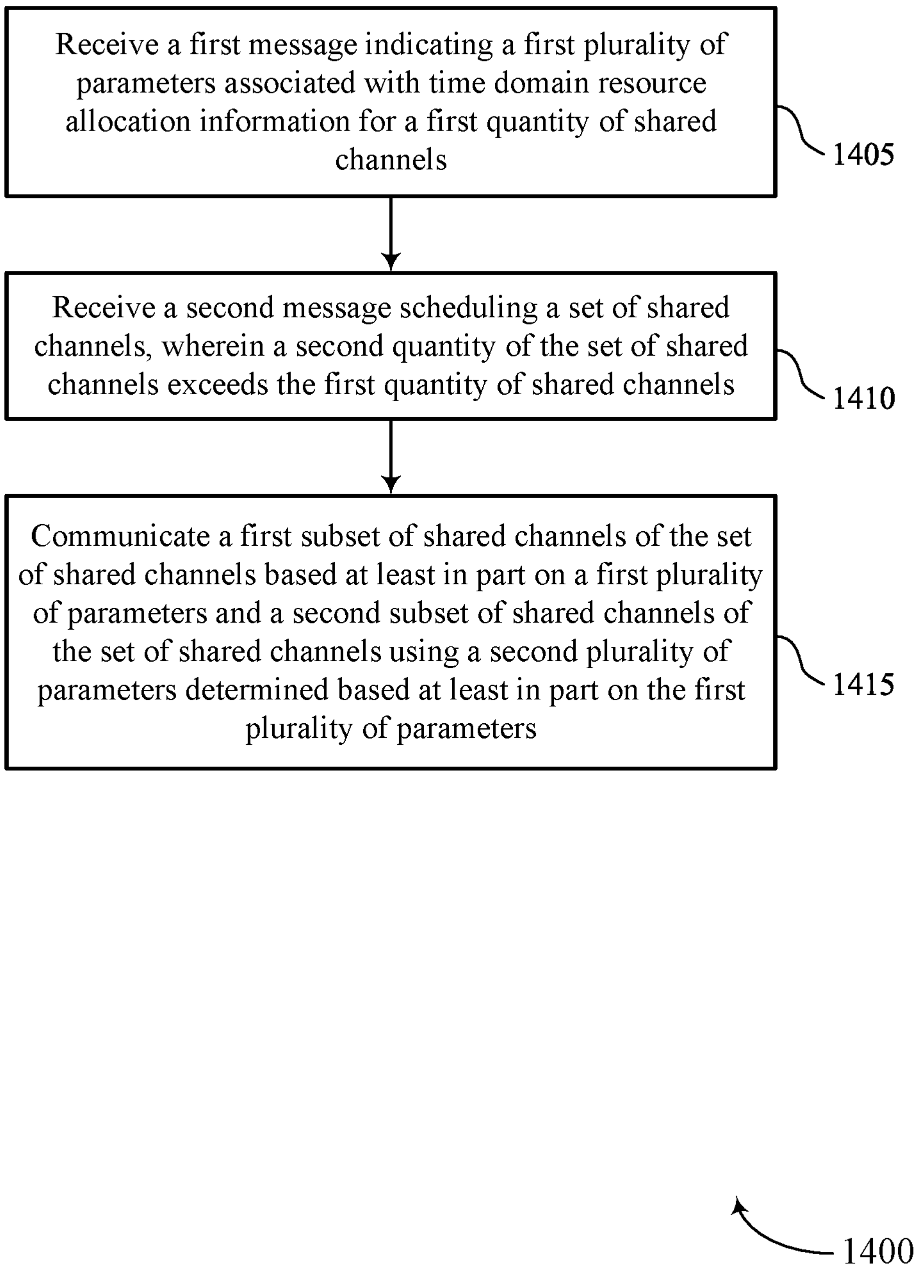
FIGS. 14 through 19 show flowcharts illustrating methods that support multi-shared channel scheduling for XR in accordance with one or more aspects of the present disclosure.

FIG. 14 shows a flowchart illustrating a method 1400 that supports multi-shared channel scheduling for XR in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a first set of multiple parameters associated with TDRA information for a first quantity of shared channels. The operations of 1405 may be performed in accordance with examples as disclosed herein. In some examples, aspects of the operations of 1405 may be performed by a TDRA information component 825 as described with reference to FIG. 8.

At 1410, the method may include receiving a second message scheduling a set of shared channels, where a second quantity of the set of shared channels exceeds the first quantity of shared channels. The operations of 1410 may be performed in accordance with examples as disclosed herein. In some examples, aspects of the operations of 1410 may be performed by a scheduling message component 830 as described with reference to FIG. 8.

At 1415, the method may include communicating a first subset of shared channels of the set of shared channels based on the first set of multiple parameters and a second subset of shared channels of the set of shared channels using a second set of multiple parameters determined based on the first set of multiple parameters. The operations of 1415 may be performed in accordance with examples as disclosed herein. In some examples, aspects of the operations of 1415 may be performed by a communication component 835 as described with reference to FIG. 8.

Figure 15:
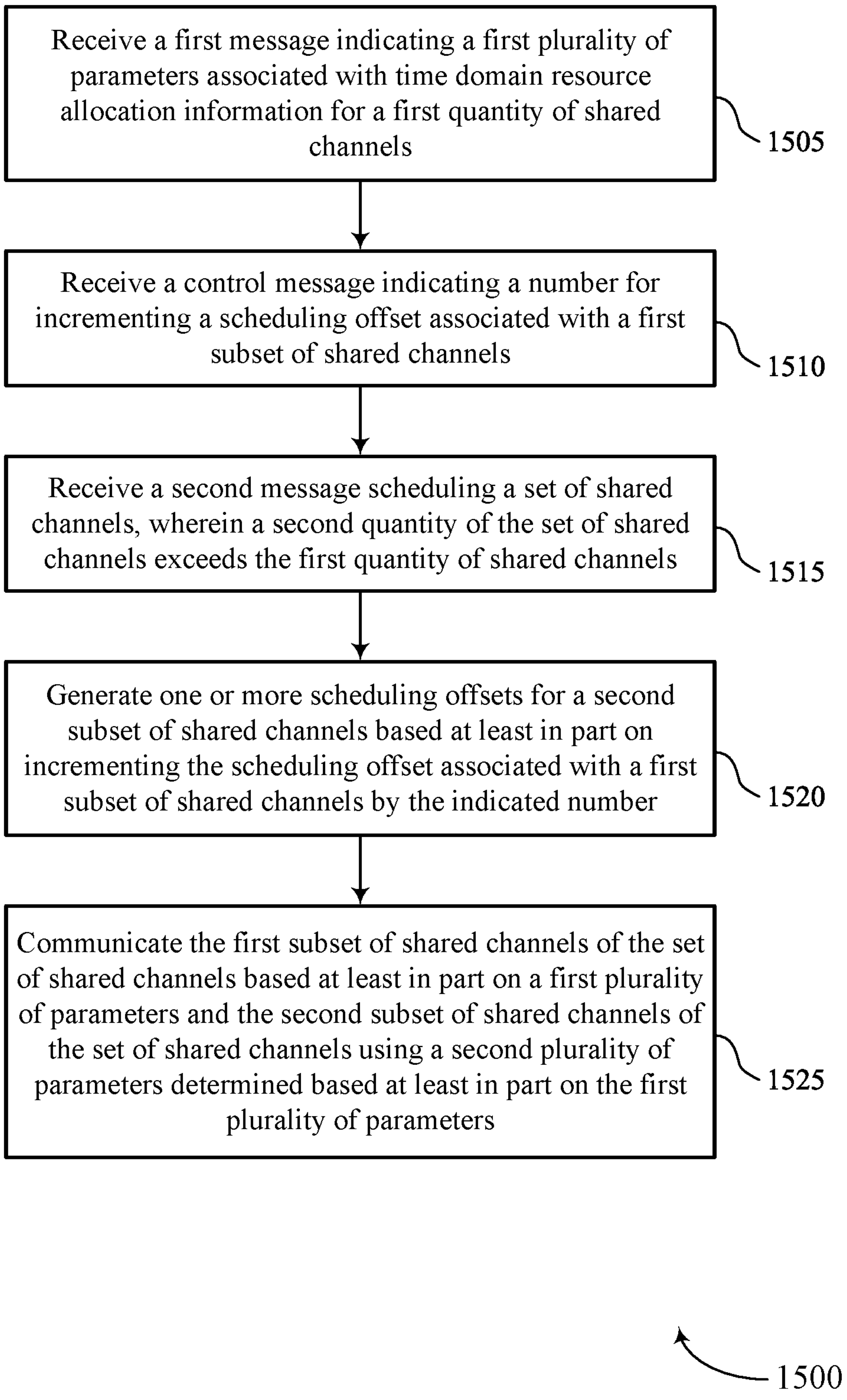

FIG. 15 shows a flowchart illustrating a method 1500 that supports multi-shared channel scheduling for XR in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a first set of multiple parameters associated with TDRA information for a first quantity of shared channels. The operations of 1505 may be performed in accordance with examples as disclosed herein. In some examples, aspects of the operations of 1505 may be performed by a TDRA information component 825 as described with reference to FIG. 8.

At 1510, the method may include receiving a control message indicating a number for incrementing a scheduling offset associated with a first subset of shared channels. The operations of 1510 may be performed in accordance with examples as disclosed herein. In some examples, aspects of the operations of 1510 may be performed by a control message component 840 as described with reference to FIG. 8.

At 1515, the method may include receiving a second message scheduling a set of shared channels, where a second quantity of the set of shared channels exceeds the first quantity of shared channels. The operations of 1515 may be performed in accordance with examples as disclosed herein. In some examples, aspects of the operations of 1515 may be performed by a scheduling message component 830 as described with reference to FIG. 8.

At 1520, the method may include generating one or more scheduling offsets for a second subset of shared channels based on incrementing the scheduling offset associated with the first subset of shared channels by the indicated number. The operations of 1520 may be performed in accordance with examples as disclosed herein. In some examples, aspects of the operations of 1520 may be performed by a scheduling offset component 845 as described with reference to FIG. 8.

At 1525, the method may include communicating the first subset of shared channels of the set of shared channels based on a first set of multiple parameters and the second subset of shared channels of the set of shared channels using a second set of multiple parameters determined based on the first set of multiple parameters. The operations of 1525 may be performed in accordance with examples as disclosed herein. In some examples, aspects of the operations of 1525 may be performed by a communication component 835 as described with reference to FIG. 8.

Figure 16:
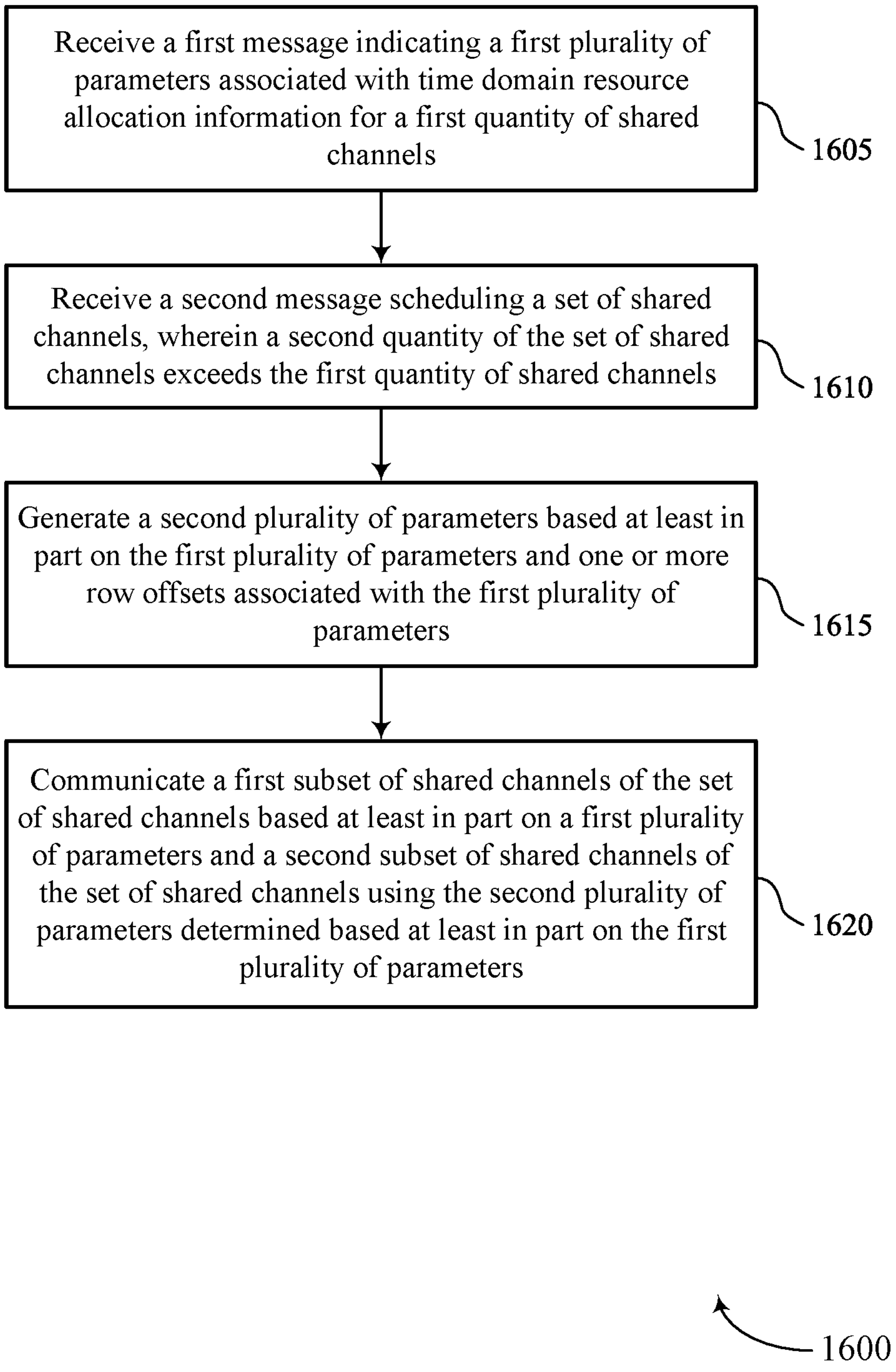

FIG. 16 shows a flowchart illustrating a method 1600 that supports multi-shared channel scheduling for XR in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating a first set of multiple parameters associated with TDRA information for a first quantity of shared channels. The operations of 1605 may be performed in accordance with examples as disclosed herein. In some examples, aspects of the operations of 1605 may be performed by a TDRA information component 825 as described with reference to FIG. 8.

At 1610, the method may include receiving a second message scheduling a set of shared channels, where a second quantity of the set of shared channels exceeds the first quantity of shared channels. The operations of 1610 may be performed in accordance with examples as disclosed herein. In some examples, aspects of the operations of 1610 may be performed by a scheduling message component 830 as described with reference to FIG. 8.

At 1615, the method may include generating a second set of multiple parameters based on the first set of multiple parameters and one or more row offsets associated with the first set of multiple parameters. The operations of 1615 may be performed in accordance with examples as disclosed herein. In some examples, aspects of the operations of 1615 may be performed by a parameter component 850 as described with reference to FIG. 8.

At 1620, the method may include communicating a first subset of shared channels of the set of shared channels based on the first set of multiple parameters and a second subset of shared channels of the set of shared channels using the second set of multiple parameters determined based on the first set of multiple parameters. The operations of 1620 may be performed in accordance with examples as disclosed herein. In some examples, aspects of the operations of 1620 may be performed by a communication component 835 as described with reference to FIG. 8.

Figure 17:
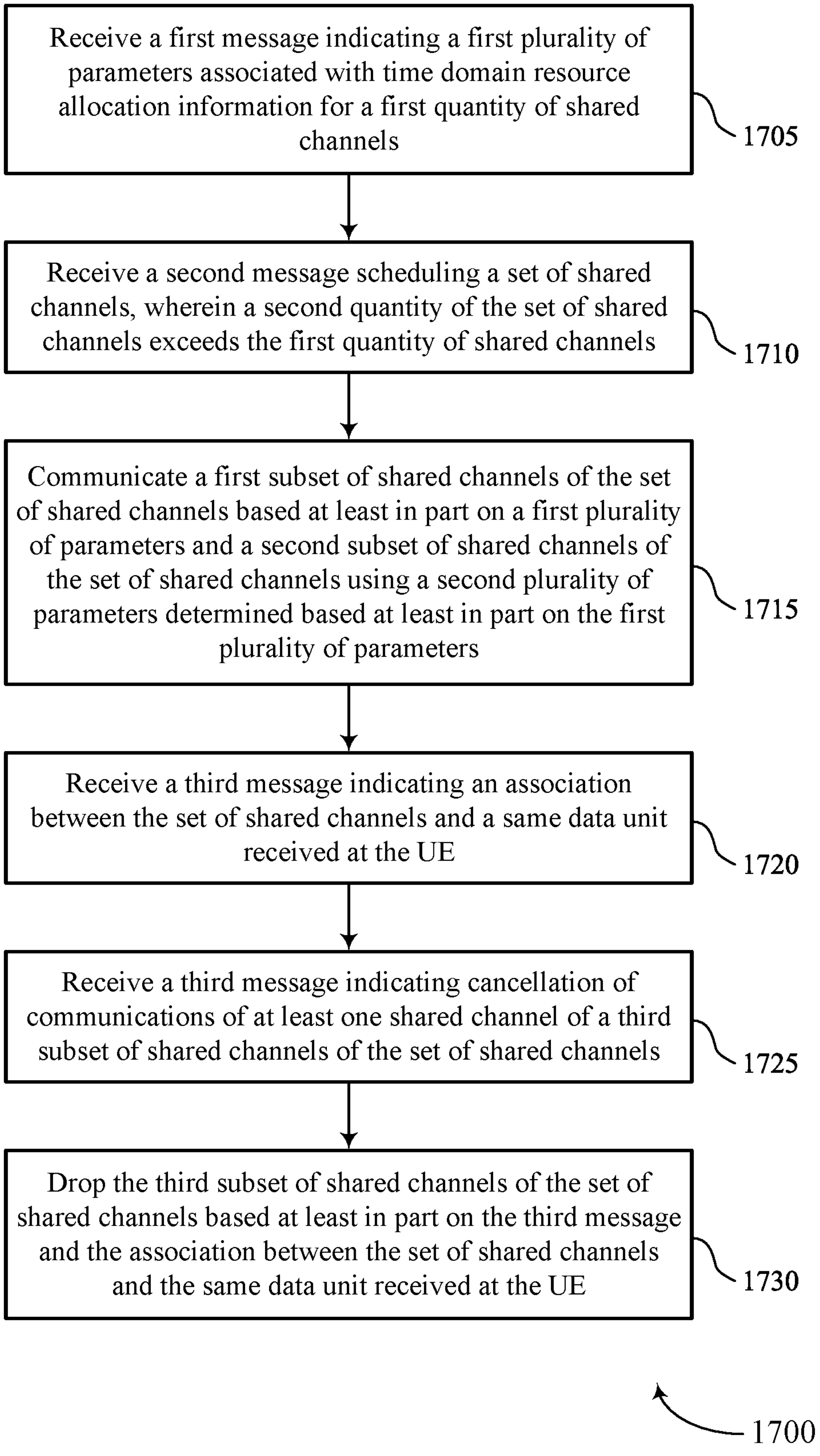

FIG. 17 shows a flowchart illustrating a method 1700 that supports multi-shared channel scheduling for XR in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a first message indicating a first set of multiple parameters associated with TDRA information for a first quantity of shared channels. The operations of 1705 may be performed in accordance with examples as disclosed herein. In some examples, aspects of the operations of 1705 may be performed by a TDRA information component 825 as described with reference to FIG. 8.

At 1710, the method may include receiving a second message scheduling a set of shared channels, where a second quantity of the set of shared channels exceeds the first quantity of shared channels. The operations of 1710 may be performed in accordance with examples as disclosed herein. In some examples, aspects of the operations of 1710 may be performed by a scheduling message component 830 as described with reference to FIG. 8.

At 1715, the method may include communicating a first subset of shared channels of the set of shared channels based on the first set of multiple parameters and a second subset of shared channels of the set of shared channels using a second set of multiple parameters determined based on the first set of multiple parameters. The operations of 1715 may be performed in accordance with examples as disclosed herein. In some examples, aspects of the operations of 1715 may be performed by a communication component 835 as described with reference to FIG. 8.

At 1720, the method may include receiving a third message indicating an association between the set of shared channels and a same data unit received at the UE. The operations of 1720 may be performed in accordance with examples as disclosed herein. In some examples, aspects of the operations of 1720 may be performed by a video data component 860 as described with reference to FIG. 8.

At 1725, the method may include receiving the third message indicating cancellation of communications of at least one shared channel of a third subset of shared channels of the set of shared channels. The operations of 1725 may be performed in accordance with examples as disclosed herein. In some examples, aspects of the operations of 1725 may be performed by a cancellation component 865 as described with reference to FIG. 8.

At 1730, the method may include dropping the third subset of shared channels of the set of shared channels based on the third message and the association between the set of shared channels and the same data unit received at the UE. The operations of 1730 may be performed in accordance with examples as disclosed herein. In some examples, aspects of the operations of 1730 may be performed by a cancellation component 865 as described with reference to FIG. 8.

Figure 18:
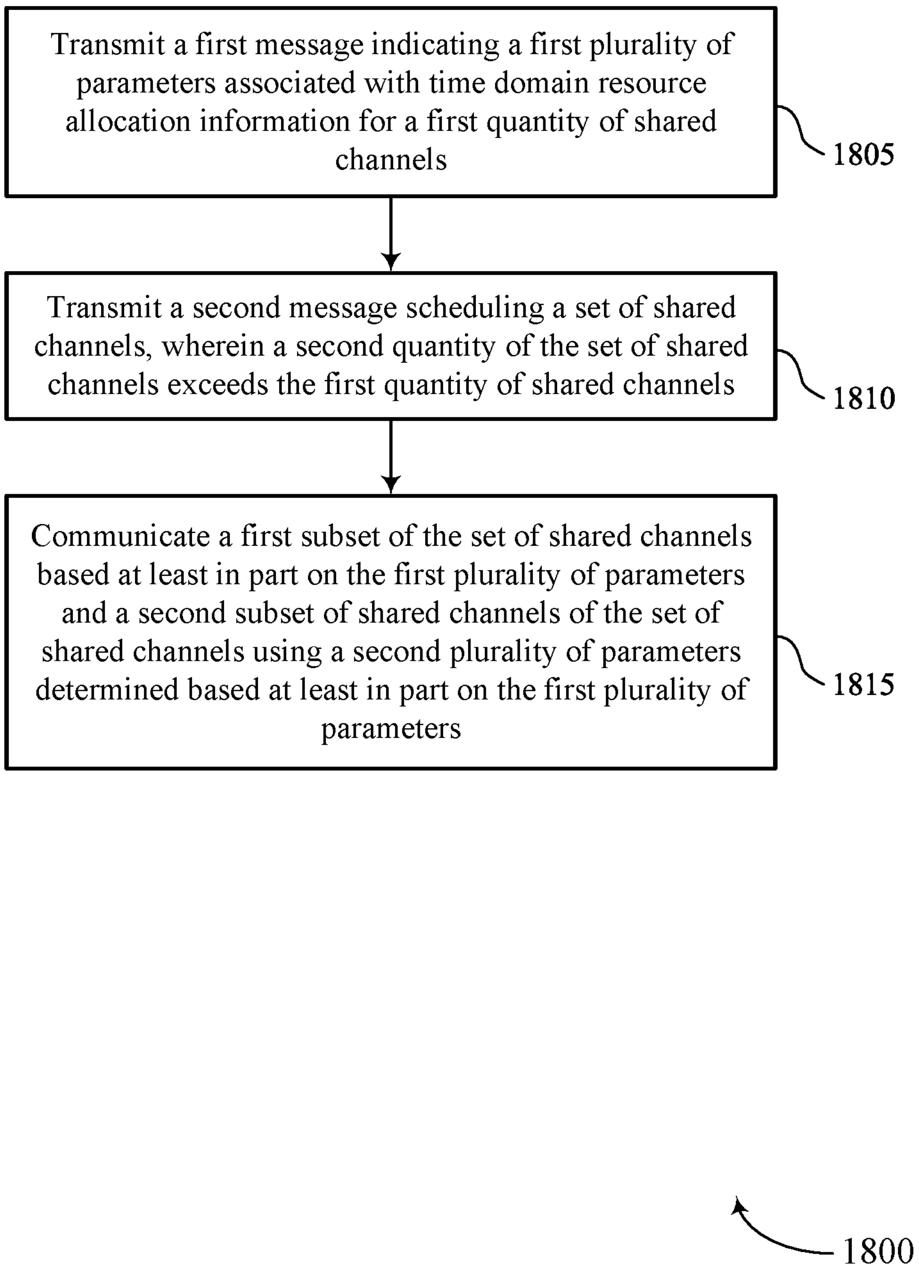

FIG. 18 shows a flowchart illustrating a method 1800 that supports multi-shared channel scheduling for XR in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first message indicating a first set of multiple parameters associated with TDRA information for a first quantity of shared channels. The operations of 1805 may be performed in accordance with examples as disclosed herein. In some examples, aspects of the operations of 1805 may be performed by a message transmission component 1225 as described with reference to FIG. 12.

At 1810, the method may include transmitting a second message scheduling a set of shared channels, where a second quantity of the set of shared channels exceeds the first quantity of shared channels. The operations of 1810 may be performed in accordance with examples as disclosed herein. In some examples, aspects of the operations of 1810 may be performed by a scheduling component 1230 as described with reference to FIG. 12.

At 1815, the method may include communicating a first subset of the set of shared channels based on the first set of multiple parameters and a second subset of shared channels of the set of shared channels using a second set of multiple parameters determined based on the first set of multiple parameters. The operations of 1815 may be performed in accordance with examples as disclosed herein. In some examples, aspects of the operations of 1815 may be performed by a shared channel component 1235 as described with reference to FIG. 12.

Figure 19:
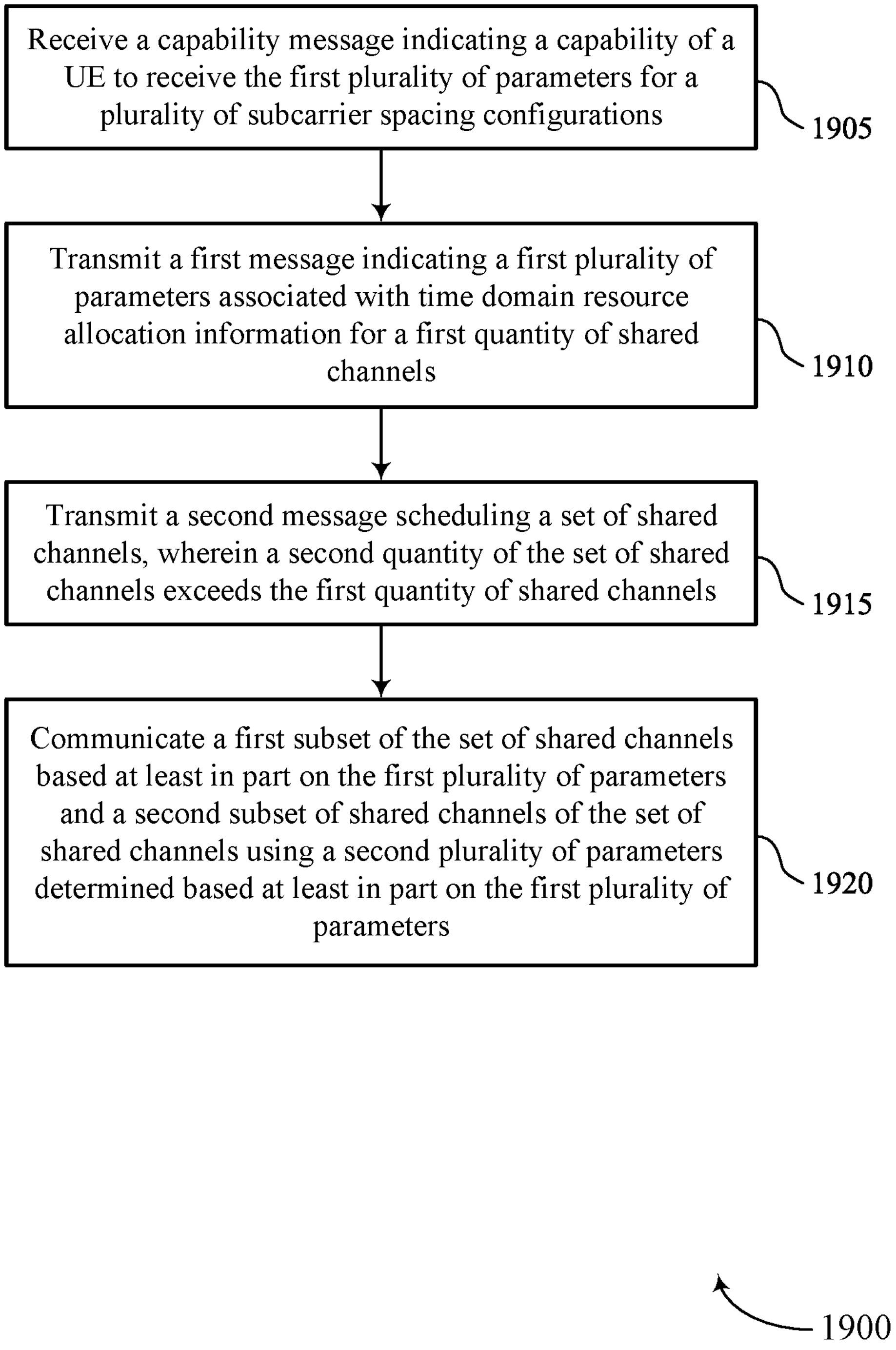

FIG. 19 shows a flowchart illustrating a method 1900 that supports multi-shared channel scheduling for XR in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving a capability message indicating a capability of a UE to receive the first set of multiple parameters for a set of multiple SCS configurations. The operations of 1905 may be performed in accordance with examples as disclosed herein. In some examples, aspects of the operations of 1905 may be performed by a capability message component 1255 as described with reference to FIG. 12.

At 1910, the method may include transmitting a first message indicating a first set of multiple parameters associated with TDRA information for a first quantity of shared channels. The operations of 1910 may be performed in accordance with examples as disclosed herein. In some examples, aspects of the operations of 1910 may be performed by a message transmission component 1225 as described with reference to FIG. 12.

At 1915, the method may include transmitting a second message scheduling a set of shared channels, where a second quantity of the set of shared channels exceeds the first quantity of shared channels. The operations of 1915 may be performed in accordance with examples as disclosed herein. In some examples, aspects of the operations of 1915 may be performed by a scheduling component 1230 as described with reference to FIG. 12.

At 1920, the method may include communicating a first subset of the set of shared channels based on the first set of multiple parameters and a second subset of shared channels of the set of shared channels using a second set of multiple parameters determined based on the first set of multiple parameters. The operations of 1920 may be performed in accordance with examples as disclosed herein. In some examples, aspects of the operations of 1920 may be performed by a shared channel component 1235 as described with reference to FIG. 12.

The following provides an overview of aspects of the present disclosure:

Aspect 1: A method for wireless communication at a UE, comprising: receiving a first message indicating a first plurality of parameters associated with TDRA information for a first quantity of shared channels; receiving a second message scheduling a set of shared channels, wherein a second quantity of the set of shared channels exceeds the first quantity of shared channels; and communicating a first subset of shared channels of the set of shared channels based at least in part on the first plurality of parameters and a second subset of shared channels of the set of shared channels using a second plurality of parameters determined based at least in part on the first plurality of parameters.

Aspect 2: The method of aspect 1, further comprising: receiving a control message indicating a number for incrementing a scheduling offset associated with the first subset of shared channels; and generating one or more scheduling offsets for the second subset of shared channels based at least in part on incrementing the scheduling offset associated with the first subset of shared channels by the indicated number.

Aspect 3: The method of aspect 2, further comprising: generating one or more respective scheduling offsets in accordance with one or more repetition values indicated by the control message, the one or more repetition values indicating one or more numbers for incrementing the scheduling offset associated with the first subset of shared channels.

Aspect 4: The method of any of aspects 1 through 3, further comprising: generating the second plurality of parameters based at least in part on the first plurality of parameters and one or more row offsets associated with the first plurality of parameters.

Aspect 5: The method of any of aspects 1 through 4, further comprising: receiving a control message indicating TDRA information associated with the second subset of shared channels; and generating the second plurality of parameters based at least in part on the control message, wherein one or more parameters of the second plurality of parameters is the same as one or more parameters of the first plurality of parameters.

Aspect 6: The method of any of aspects 1 through 5, further comprising: receiving a DCI message comprising at least one bit indicating the second plurality of parameters.

Aspect 7: The method of any of aspects 1 through 6, further comprising: determining the first plurality of parameters and the second plurality of parameters, wherein the first plurality of parameters and the second plurality of parameters each comprises a mapping type, a start symbol, a quantity of consecutive symbols, or any combination thereof.

Aspect 8: The method of any of aspects 1 through 7, further comprising: determining the second plurality of parameters based at least in part on a lookup table, wherein the lookup table indicates one of the first plurality of parameters or parameters that are based at least in part on the second quantity of the set of shared channels exceeding the first quantity of shared channels.

Aspect 9: The method of any of aspects 1 through 8, further comprising: receiving a third message indicating an association between the set of shared channels and a same data unit received at the UE.

Aspect 10: The method of aspect 9, wherein the association is based at least in part on a search space set associated with scheduling of the set of shared channels, a control resource set associated with scheduling of the set of shared channels, or both.

Aspect 11: The method of any of aspects 9 through 10, further comprising: receiving the third message indicating cancellation of communications of at least one shared channel of a third subset of shared channels of the set of shared channels; and dropping the third subset of shared channels of the set of shared channels based at least in part on the third message and the association between the set of shared channels and the same data unit received at the UE.

Aspect 12: The method of aspect 11, wherein the third message is specific to the UE.

Aspect 13: The method of any of aspects 9 through 12, further comprising: receiving the third message scheduling a second set of shared channels; and dropping a third subset of shared channels of the set of shared channels based at least in part on receiving the third message.

Aspect 14: The method of aspect 13, wherein receiving the third message comprises: receiving the third message scheduling the second set of shared channels in a duration that at least partially overlaps with a scheduled duration of the third subset of shared channels.

Aspect 15: The method of any of aspects 1 through 14, wherein the first subset and the second subset are communicated in accordance with a plurality of SCS configurations.

Aspect 16: The method of any of aspects 1 through 15, further comprising: transmitting a capability message indicating a capability of the UE to receive the first plurality of parameters for a plurality of SCS configurations.

Aspect 17: The method of any of aspects 1 through 16, wherein the set of shared channels comprises more than eight shared channels.

Aspect 18: The method of any of aspects 1 through 17, wherein receiving the second message comprises: receiving the second message indicating an NDI, an RV field, or both, wherein the NDI and the RV field each comprise a quantity of bits based at least in part on the second quantity of shared channels.

Aspect 19: The method of any of aspects 1 through 18, further comprising: receiving a control message indicating that an RV of an RV field is to be used for a retransmission of the set of shared channels by the UE, wherein the second message excludes the RV field.

Aspect 20: A method for wireless communication at a network entity, comprising: transmitting a first message indicating a first plurality of parameters associated with TDRA information for a first quantity of shared channels; transmitting a second message scheduling a set of shared channels, wherein a second quantity of the set of shared channels exceeds the first quantity of shared channels; and communicating a first subset of the set of shared channels based at least in part on the first plurality of parameters and a second subset of shared channels of the set of shared channels using a second plurality of parameters determined based at least in part on the first plurality of parameters.

Aspect 21: The method of aspect 20, further comprising: transmitting a control message indicating a number for incrementing a scheduling offset associated with the first subset of shared channels.

Aspect 22: The method of any of aspects 20 through 21, further comprising: transmitting a control message indicating TDRA information associated with the second subset of shared channels.

Aspect 23: The method of any of aspects 20 through 22, further comprising: transmitting a DCI message comprising at least one bit indicating the second plurality of parameters.

Aspect 24: The method of any of aspects 20 through 23, wherein the first plurality of parameters and the second plurality of parameters each comprises a mapping type, a start symbol, a quantity of consecutive symbols, or any combination thereof.

Aspect 25: The method of any of aspects 20 through 24, further comprising: transmitting a third message indicating an association between the set of shared channels and a same data unit received at a UE.

Aspect 26: The method of aspect 25, wherein the association is based at least in part on a search space set associated with scheduling of the set of shared channels, a control resource set associated with scheduling of the set of shared channels, or both.

Aspect 27: The method of any of aspects 25 through 26, further comprising: transmitting the third message indicating cancellation of communications of at least one shared channel of a third subset of shared channels of the set of shared channels.

Aspect 28: The method of aspect 27, wherein the third message is specific to the UE.

Aspect 29: The method of any of aspects 25 through 28, further comprising: transmitting the third message scheduling a second set of shared channels.

Aspect 30: The method of aspect 29, wherein transmitting the third message comprises: transmitting the third message scheduling the second set of shared channels in a duration that at least partially overlaps with a scheduled duration of a third subset of shared channels.

Aspect 31: The method of any of aspects 20 through 30, wherein the first subset and the second subset are communicated in accordance with a plurality of SCS configurations.

Aspect 32: The method of any of aspects 20 through 31, further comprising: receiving a capability message indicating a capability of a UE to receive the first plurality of parameters for a plurality of SCS configurations.

Aspect 33: The method of any of aspects 20 through 32, wherein the set of shared channels comprises more than eight shared channels.

Aspect 34: The method of any of aspects 20 through 33, wherein transmitting the second message comprises: transmitting the second message indicating an NDI, an RV field, or both, wherein the NDI and the RV field each comprise a quantity of bits based at least in part on the second quantity of shared channels.

Aspect 35: The method of any of aspects 20 through 34, further comprising: excluding an RV of an RV field from the second message based at least in part on the second quantity of shared channels exceeding the first quantity of shared channels; and transmitting a control message indicating that the RV is to be used for a retransmission of the set of shared channels by a UE.

Aspect 36: An apparatus for wireless communication at a UE, comprising a processor; memory coupled with the processor; and instructions stored in the memory and executable by the processor to cause the apparatus to perform a method of any of aspects 1 through 19.

Aspect 37: An apparatus for wireless communication at a UE, comprising at least one means for performing a method of any of aspects 1 through 19.

Aspect 38: A non-transitory computer-readable medium storing code for wireless communication at a UE, the code comprising instructions executable by a processor to perform a method of any of aspects 1 through 19.

Aspect 39: An apparatus for wireless communication at a network entity, comprising a processor; memory coupled with the processor; and instructions stored in the memory and executable by the processor to cause the apparatus to perform a method of any of aspects 20 through 35.

Aspect 40: An apparatus for wireless communication at a network entity, comprising at least one means for performing a method of any of aspects 20 through 35.

Aspect 41: A non-transitory computer-readable medium storing code for wireless communication at a network entity, the code comprising instructions executable by a processor to perform a method of any of aspects 20 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a first message indicating a first plurality of parameters of a time domain resource allocation table for a first quantity of shared channels, wherein the first quantity of shared channels comprises a threshold quantity of shared channels indicated by the time domain resource allocation table;

receiving a second message scheduling a set of shared channels, wherein a second quantity of the set of shared channels exceeds the threshold quantity of shared channels; and communicating a first subset of shared channels of the set of shared channels based at least in part on the first plurality of parameters and a second subset of shared channels of the set of shared channels using a second plurality of parameters determined based at least in part on the first plurality of parameters.

2. The method of claim 1, further comprising:

receiving a control message indicating a number for incrementing a scheduling offset associated with the first subset of shared channels; and generating one or more scheduling offsets for the second subset of shared channels based at least in part on incrementing the scheduling offset associated with the first subset of shared channels by the indicated number.

3. The method of claim 2, further comprising:

generating one or more respective scheduling offsets in accordance with one or more repetition values indicated by the control message, the one or more repetition values indicating one or more numbers for incrementing the scheduling offset associated with the first subset of shared channels.

4. The method of claim 1, further comprising:

generating the second plurality of parameters based at least in part on the first plurality of parameters and one or more row offsets associated with the first plurality of parameters.

5. The method of claim 1, further comprising:

receiving a control message indicating time domain resource allocation information associated with the second subset of shared channels; and generating the second plurality of parameters based at least in part on the control message, wherein one or more parameters of the second plurality of parameters is the same as one or more parameters of the first plurality of parameters.

6. The method of claim 1, further comprising:

receiving a downlink control information message comprising at least one bit indicating the second plurality of parameters.

7. The method of claim 1, further comprising:

determining the first plurality of parameters and the second plurality of parameters, wherein the first plurality of parameters and the second plurality of parameters each comprises a mapping type, a start symbol, a quantity of consecutive symbols, or any combination thereof.

8. The method of claim 1, further comprising:

determining the second plurality of parameters based at least in part on a lookup table, wherein the lookup table indicates one of the first plurality of parameters or parameters that are based at least in part on the second quantity of the set of shared channels exceeding the first quantity of shared channels.

9. The method of claim 1, further comprising:

receiving a third message indicating an association between the set of shared channels and a same data unit received at the UE.

10. The method of claim 9, wherein the association is based at least in part on a search space set associated with scheduling of the set of shared channels, a control resource set associated with scheduling of the set of shared channels, or both.

11. The method of claim 9, further comprising:

receiving the third message indicating cancellation of communications of at least one shared channel of a third subset of shared channels of the set of shared channels; and dropping the third subset of shared channels of the set of shared channels based at least in part on the third message and the association between the set of shared channels and the same data unit received at the UE.

12. The method of claim 11, wherein the third message is specific to the UE.

13. The method of claim 9, further comprising:

receiving the third message scheduling a second set of shared channels; and dropping a third subset of shared channels of the set of shared channels based at least in part on receiving the third message.

14. The method of claim 13, wherein receiving the third message comprises:

receiving the third message scheduling the second set of shared channels in a duration that at least partially overlaps with a scheduled duration of the third subset of shared channels.

15. The method of claim 1, wherein the first subset of shared channels and the second subset of shared channels are communicated in accordance with a plurality of subcarrier spacing configurations.

16. The method of claim 1, further comprising:

transmitting a capability message indicating a capability of the UE to receive the first plurality of parameters for a plurality of subcarrier spacing configurations.

17. The method of claim 1, wherein the set of shared channels comprises more than eight shared channels.

18. The method of claim 1, wherein receiving the second message comprises:

receiving the second message indicating a new data indicator, a redundancy version field, or both, wherein the new data indicator and the redundancy version field each comprise a quantity of bits based at least in part on the second quantity of shared channels.

19. The method of claim 1, further comprising:

receiving a control message indicating that a redundancy version of a redundancy version field is to be used for a retransmission of the set of shared channels by the UE, wherein the second message excludes the redundancy version field.

20. A method for wireless communication at a network entity, comprising:

transmitting a first message indicating a first plurality of parameters of a time domain resource allocation table for a first quantity of shared channels, wherein the first quantity of shared channels comprises a threshold quantity of shared channels indicated by the time domain resource allocation table;

transmitting a second message scheduling a set of shared channels, wherein a second quantity of the set of shared channels exceeds the threshold quantity of shared channels; and communicating a first subset of the set of shared channels based at least in part on the first plurality of parameters and a second subset of shared channels of the set of shared channels using a second plurality of parameters determined based at least in part on the first plurality of parameters.

21. The method of claim 20, further comprising:

transmitting a control message indicating a number for incrementing a scheduling offset associated with the first subset of the set of shared channels.

22. The method of claim 20, further comprising:

transmitting a control message indicating time domain resource allocation information associated with the second subset of shared channels.

23. The method of claim 20, further comprising:

transmitting a downlink control information message comprising at least one bit indicating the second plurality of parameters.

24. The method of claim 20, wherein the first plurality of parameters and the second plurality of parameters each comprises a mapping type, a start symbol, a quantity of consecutive symbols, or any combination thereof.

25. The method of claim 20, further comprising:

transmitting a third message indicating an association between the set of shared channels and a same data unit received at a user equipment (UE).

26. The method of claim 25, wherein the association is based at least in part on a search space set associated with scheduling of the set of shared channels, a control resource set associated with scheduling of the set of shared channels, or both.

27. The method of claim 25, further comprising:

transmitting the third message indicating cancellation of communications of at least one shared channel of a third subset of shared channels of the set of shared channels.

28. The method of claim 27, wherein the third message is specific to the UE.

29. A user equipment (UE) for wireless communication, comprising:

at least one processor;

at least one memory coupled with the at least one processor; and instructions stored in the at least one memory and executable by the at least one processor to cause the UE to:

receive a first message indicating a first plurality of parameters of a time domain resource allocation table for a first quantity of shared channels, wherein the first quantity of shared channels comprises a threshold quantity of shared channels indicated by the time domain resource allocation table;

receive a second message scheduling a set of shared channels, wherein a second quantity of the set of shared channels exceeds the threshold quantity of shared channels; and communicate a first subset of shared channels of the set of shared channels based at least in part on the first plurality of parameters and a second subset of shared channels of the set of shared channels using a second plurality of parameters determined based at least in part on the first plurality of parameters.

30. A network entity for wireless communication, comprising:

at least one processor;

at least one memory coupled with the at least one processor; and instructions stored in the at least one memory and executable by the at least one processor to cause the network entity to:

transmit a first message indicating a first plurality of parameters of a time domain resource allocation table for a first quantity of shared channels, wherein the first quantity of shared channels comprises a threshold quantity of shared channels indicated by the time domain resource allocation table;

transmit a second message scheduling a set of shared channels, wherein a second quantity of the set of shared channels exceeds the threshold quantity of shared channels; and communicate a first subset of the set of shared channels based at least in part on the first plurality of parameters and a second subset of shared channels of the set of shared channels using a second plurality of parameters determined based at least in part on the first plurality of parameters.

* * * * *